(12) United States Patent
Liang et al.

(10) Patent No.: US 10,163,180 B2
(45) Date of Patent: Dec. 25, 2018

(54) ADAPTIVE MEMORY ADDRESS SCANNING BASED ON SURFACE FORMAT FOR GRAPHICS PROCESSING

(71) Applicant: QUALCOMM Incorporated, San Diego, CA (US)

(72) Inventors: Jian Liang, San Diego, CA (US); Minjie Huang, San Diego, CA (US); Chunlin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 14/699,806

(22) Filed: Apr. 29, 2015

(65) Prior Publication Data

US 2016/0321774 A1 Nov. 3, 2016

(51) Int. Cl.
*G06T 1/60* (2006.01)
*G06T 1/20* (2006.01)
*G06T 11/40* (2006.01)

(52) U.S. Cl.
CPC .................. *G06T 1/20* (2013.01); *G06T 1/60* (2013.01); *G06T 11/40* (2013.01)

(58) Field of Classification Search
CPC .............................. G06T 1/60; G06T 2210/52
USPC .................................................. 345/530–574
See application file for complete search history.

(56) References Cited

U.S. PATENT DOCUMENTS

| 5,325,485 | A | * | 6/1994 | Hochmuth | ............ | G06T 15/405 |
| | | | | | | 345/422 |
| 5,579,458 | A | * | 11/1996 | Yokosuka | ............ | G09G 3/3644 |
| | | | | | | 345/540 |
| 6,778,177 | B1 | * | 8/2004 | Furtner | .................. | G06T 15/50 |
| | | | | | | 345/443 |
| 6,801,209 | B1 | * | 10/2004 | Chen | ....................... | G06F 12/04 |
| | | | | | | 345/557 |
| 6,885,378 | B1 | * | 4/2005 | Tsai | ...................... | G06T 15/005 |
| | | | | | | 345/541 |

(Continued)

FOREIGN PATENT DOCUMENTS

| CN | 104199782 A | 12/2014 |
| WO | 2013091185 A1 | 6/2013 |

OTHER PUBLICATIONS

Singhal et al., "Implementation and Optimization of Image Processing Algorithms on Embedded GPU", 2012.*

(Continued)

*Primary Examiner* — Phong Nguyen
(74) *Attorney, Agent, or Firm* — Shumaker & Sieffert, P.A.

(57) ABSTRACT

This disclosure describes an adaptive memory address scanning technique that defines an address scanning pattern, to be used for a particular surface, based on one or more properties of the surface. In addition, a number, shape, and arrangement of sub-primitives of a surface to process in parallel may be determined. In one example of the disclosure, a memory accessing method for graphics processing comprises, determining, by a graphics processing unit (GPU), properties of a surface, determining, by the GPU, a memory address scanning technique based on the determined properties of the surface, and performing, by the GPU, at least one of a read or a write of data associated with the surface in a memory based on the determined memory address scanning technique.

30 Claims, 17 Drawing Sheets

(56) References Cited

U.S. PATENT DOCUMENTS

| | | | | |
|---|---|---|---|---|
| 7,190,368 B2* | 3/2007 | Linzer | G09G 5/39 | 345/533 |
| 7,420,568 B1* | 9/2008 | Bittel | G06T 15/005 | 345/422 |
| 7,545,382 B1* | 6/2009 | Montrym | G06T 1/60 | 345/530 |
| 7,872,657 B1* | 1/2011 | Edmondson | G06F 12/0607 | 345/540 |
| 7,932,912 B1* | 4/2011 | Van Dyke | G06T 15/005 | 345/544 |
| 8,271,734 B1* | 9/2012 | Glasco | G06F 12/084 | 345/546 |
| 8,350,832 B2* | 1/2013 | Sonoyama | G09G 3/20 | 345/204 |
| 8,923,405 B1* | 12/2014 | Lee | H04N 19/18 | 345/536 |
| 9,355,430 B2* | 5/2016 | Lum | G06T 1/60 | |
| 2004/0130553 A1* | 7/2004 | Ushida | G06T 1/0007 | 345/531 |
| 2006/0044317 A1* | 3/2006 | Bourd | G06T 1/60 | 345/557 |
| 2008/0162802 A1* | 7/2008 | Akiyama | G06F 12/0207 | 711/105 |
| 2009/0232211 A1* | 9/2009 | Chen | H04N 19/105 | 375/240.13 |
| 2010/0149195 A1* | 6/2010 | Fernando | G06F 9/505 | 345/505 |
| 2011/0074802 A1* | 3/2011 | Nickolls | G06T 1/60 | 345/564 |
| 2011/0115813 A1* | 5/2011 | Yamakura | G06T 11/00 | 345/611 |
| 2011/0243220 A1* | 10/2011 | Seregin | H04N 19/176 | 375/240.02 |
| 2012/0007992 A1* | 1/2012 | Zhou | H04N 19/433 | 348/206 |
| 2012/0162250 A1* | 6/2012 | Glen | G09G 5/363 | 345/629 |
| 2012/0176386 A1* | 7/2012 | Hutchins | G06T 1/20 | 345/522 |
| 2012/0206447 A1* | 8/2012 | Hutchins | G06T 15/005 | 345/419 |
| 2012/0320069 A1* | 12/2012 | Lee | G06F 9/505 | 345/505 |
| 2013/0076761 A1* | 3/2013 | Ellis | G06F 15/16 | 345/502 |
| 2013/0077868 A1* | 3/2013 | Ito | G06T 1/60 | 382/195 |
| 2013/0286028 A1* | 10/2013 | Hur | G09G 5/39 | 345/540 |
| 2014/0063030 A1* | 3/2014 | Metcalfe | G06T 1/60 | 345/531 |
| 2014/0118373 A1* | 5/2014 | Hakura | G06T 17/20 | 345/545 |
| 2014/0139534 A1* | 5/2014 | Tapply | G06T 11/40 | 345/522 |
| 2014/0176586 A1 | 6/2014 | Gruber et al. | | |
| 2014/0177971 A1* | 6/2014 | Strom | H04N 19/46 | 382/232 |
| 2014/0294090 A1* | 10/2014 | Chen | H04N 19/51 | 375/240.24 |
| 2014/0347380 A1* | 11/2014 | Akenine-Moller | G09G 5/39 | 345/555 |
| 2015/0091918 A1 | 4/2015 | Kim et al. | | |
| 2015/0091921 A1* | 4/2015 | Cote | G06T 1/20 | 345/522 |
| 2015/0170318 A1* | 6/2015 | Gould | G06T 1/20 | 345/505 |
| 2015/0228049 A1* | 8/2015 | Yang | G06T 1/20 | 345/501 |
| 2015/0242681 A1* | 8/2015 | Aliseitchik | G06K 9/00335 | 382/103 |

OTHER PUBLICATIONS

Jang et al., "Exploiting Memory Access Patterns to Improve Memory Performance in Data-Parallel Architectures," IEEE Transactions on Parallel and Distributed Systems, vol. 22 No. 1, Jan. 2011, 14 pp.

Rhu et al., "A Locality-Aware Memory Hierarchy for Energy-Efficient GPU Architectures," MICRO-46 Proceedings of the 46th Annual IEEE/ACM International Symposium on Microarchitecture, Dec. 7-11, 2013, 13 pp.

International Search Report and Written Opinion from International Application No. PCT/US2016/020436, dated May 24, 2016, 10 pp.

"Intel Open Source HD Graphics and Intel Iris Plus Graphics," Programmer's Reference Manual, vol. 5: Memory Views, Revision 1.0, Jan. 2017, 362 pages.

International Preliminary Report on Patentability of International Application No. PCT/US2016/020436 dated Nov. 9, 2017, 7 pp.

\* cited by examiner

2D Surface (2D Primitive)

| Source FORMAT | | 8 bpp | 16 bpp | 32 bpp | 64 bpp | 128 bpp | 256 bpp | 512 bpp | NV21/NV12 | NV21-4R/NV12-4R | IYUV |
|---|---|---|---|---|---|---|---|---|---|---|---|
| Square | | 256x64 | 128x64 | 64x64 | 64x32 | 32x32 | 32x16 | 16x16 | 128x64 | 128x64 | 128x64 |
| Minimum height | 4 | 4kx4 | 2kx4 | 1kx4 | 512x4 | 256x4 | 128x4 | 64x4 | X | 2kx4 | 2kx4 |
| | 8 | 2kx8 | 1kx8 | 512x8 | 256x8 | 128x8 | X | X | X | 1kx8 | 1kx8 |
| Balance | | 1kx16 | 512x16 | 256x16 | 128x16 | 64x16 | 32x16 | 16x16 | 512x16 | 512x16 | 512x16 |

SUPER BLOCK SIZE DETERMINATION

FIG. 10

| FORMAT | 8 bpp | 16 bpp | 32 bpp | 64 bpp | 128 bpp | 256 bpp | 512 bpp | Y (NV12/NV21) | UV(SRC) (NV12/NV21) | Y (NV12-4R/NV21-4R) | UV (NV12-4R/NV21-4R) | Y/U/V (IYUV) |
|---|---|---|---|---|---|---|---|---|---|---|---|---|
| Tiling | 16x4 | 16x4 | 16x4 | 8x4 | 4x4 | 4x2 | 2x2 | 32x8 | 16x8 | 64x4 | 32x4 | X |
| Linear | 64x4 | 32x4 | 16x4 | 8x4 | 4x4 | 4x2 | 2x2 | X | X | 64x4 | 32x4 | 64x4 |

BASIS BLOCK SIZE DETERMINATION - "FINAL BPP" = "ORIGINAL BPP" X "MSAA" WHEN MSAA IS USED

FIG. 13

ADAPTIVE MEMORY ADDRESS SCANNING BASED ON SURFACE FORMAT FOR GRAPHICS PROCESSING

TECHNICAL FIELD

This disclosure relates to memory operations for graphics processing, and more particularly relates to address scanning in a computer memory system.

BACKGROUND

Computing systems, including systems using a graphics processing unit (GPU), may use multi-channel memory systems to alleviate memory bottlenecks by increasing the amount of available memory bandwidth. For example, a multi-channel memory system can include a plurality of memory controllers that each controls a separate memory unit. The plurality of memory controllers increases the available bandwidth of the multi-channel memory system compared to a memory system that includes only a single memory controller by being able to handle more memory requests than the single memory controller.

The performance of a multi-channel memory system can be optimized by keeping the workload of the memory channels in the multi-channel memory system well-balanced to maximize the utilization of the available bandwidth across the memory channels of the memory system. In a well-balanced multi-channel memory system, memory loads may be spread across the memory controllers in the memory system. Conversely, unbalanced memory loads in the memory channels of the multi-channel memory system may decrease the advantages of multi-channel memory systems. For example, if a memory system is unbalanced so that some of the memory channels in the memory system shoulder a disproportionate amount of the memory load compared to other memory channels in the memory system, those other memory channels in the memory system may have available memory bandwidth that is underutilized, thereby decreasing the performance of the memory system.

SUMMARY

In general, this disclosure describes techniques for accessing memory in a graphics processing system. In particular, this disclosure describes an adaptive memory address scanning technique that defines an address scanning pattern, to be used for a particular surface, based on one or more properties of the surface.

In one example of the disclosure, a memory accessing method for graphics processing comprises, determining, by a graphics processing unit (GPU), properties of a surface, determining, by the GPU, a memory address scanning technique based on the determined properties of the surface, and performing, by the GPU, at least one of a read or a write of data associated with the surface in a memory based on the determined memory address scanning technique.

In another example of the disclosure, an apparatus configured to access memory for graphics processing comprises a memory configured to store data associated with a surface, and GPU in communication with the memory, the GPU configured to determine properties of the surface, determine a memory address scanning technique based on the determined properties of the surface, and perform at least one of a read or a write of data associated with the surface in the memory based on the determined memory address scanning technique.

In another example of the disclosure, a GPU configured to access memory for graphics processing comprises a 2D dispatch processor configured to determine properties of a surface, and determine a memory address scanning technique based on the determined properties of the surface, and at least one 2D sub-engine configured to perform at least one of a read or a write of data associated with the surface in a memory based on the determined memory address scanning technique.

In another example of the disclosure, an apparatus configured to access memory for graphics processing comprises means for determining properties of a surface, means for determining a memory address scanning technique based on the determined properties of the surface, and means for performing at least one of a read or a write of data associated with the surface in a memory based on the determined memory address scanning technique.

The details of one or more examples are set forth in the accompanying drawings and the description below. Other features, objects, and advantages will be apparent from the description and drawings, and from the claims.

BRIEF DESCRIPTION OF DRAWINGS

FIG. 10 is a table showing example sizes of super blocks according to one example of the disclosure.

FIG. 13 is a table showing example sizes of basic blocks according to one example of the disclosure.

DETAILED DESCRIPTION

In mobile devices, memory efficiency is an important aspect for the performance and power efficiency of the mobile device. Memory efficiency may be particularly important for the operation of a graphics processing unit, as rendering an image or surface may require many memory accesses. In some examples, low memory efficiency may be caused by inefficient addressing patterns (i.e., the order in which pixels of an image or surface are accessed in memory), which may result in a large number of page misses, bank conflicts, read/write switching, and other similar addressing problems. Many modern memory systems attempt to improve memory efficiency by designing a single, more optimal addressing scheme. However, data sizes and data organization formats of images and surfaces are typically different for various applications. As such, it is difficult for one addressing scheme to be efficient for all use cases.

Within a GPU, a so-called "2D engine" may be responsible for data moving, data copying, data conversions, address rearrangement, scaling, and other functions whereby data is accessed from, or written to, memory. The efficiency of such a 2D engine has an effect on the overall performance and power efficiency of the GPU. The 2D engine may be responsible for handling data in various image/surface formats. For example, an image/surface may be organized in one dimension, two dimensions, or three dimensions. Data representing an image/surface may also be stored in a variety of different modes (i.e., the storage mode), including a linear mode (data arranged into lines), a tiling mode (data arranged into rectangular blocks), and a macro-tile mode (data arranged into blocks with multiple rectangular sub-blocks). In addition, pixels in the image/surface may have different bit lengths. To better improve memory efficiency, the read and write actions of the 2D engine may use a specific memory addressing pattern, including type writer scanning, tile-based scanning, Hilbert scanning, special scanning, etc. However, such patterns may only allow for efficient memory use for some image/surface formats, and may be generally poor choices for other image/surface formats.

In view of these drawbacks, this disclosure proposes an adaptive memory address scanning technique. The adaptive memory address scanning techniques of this disclosure may define an address scanning pattern to be used for a particular surface based on one or more properties of the surface.

Figure 1:
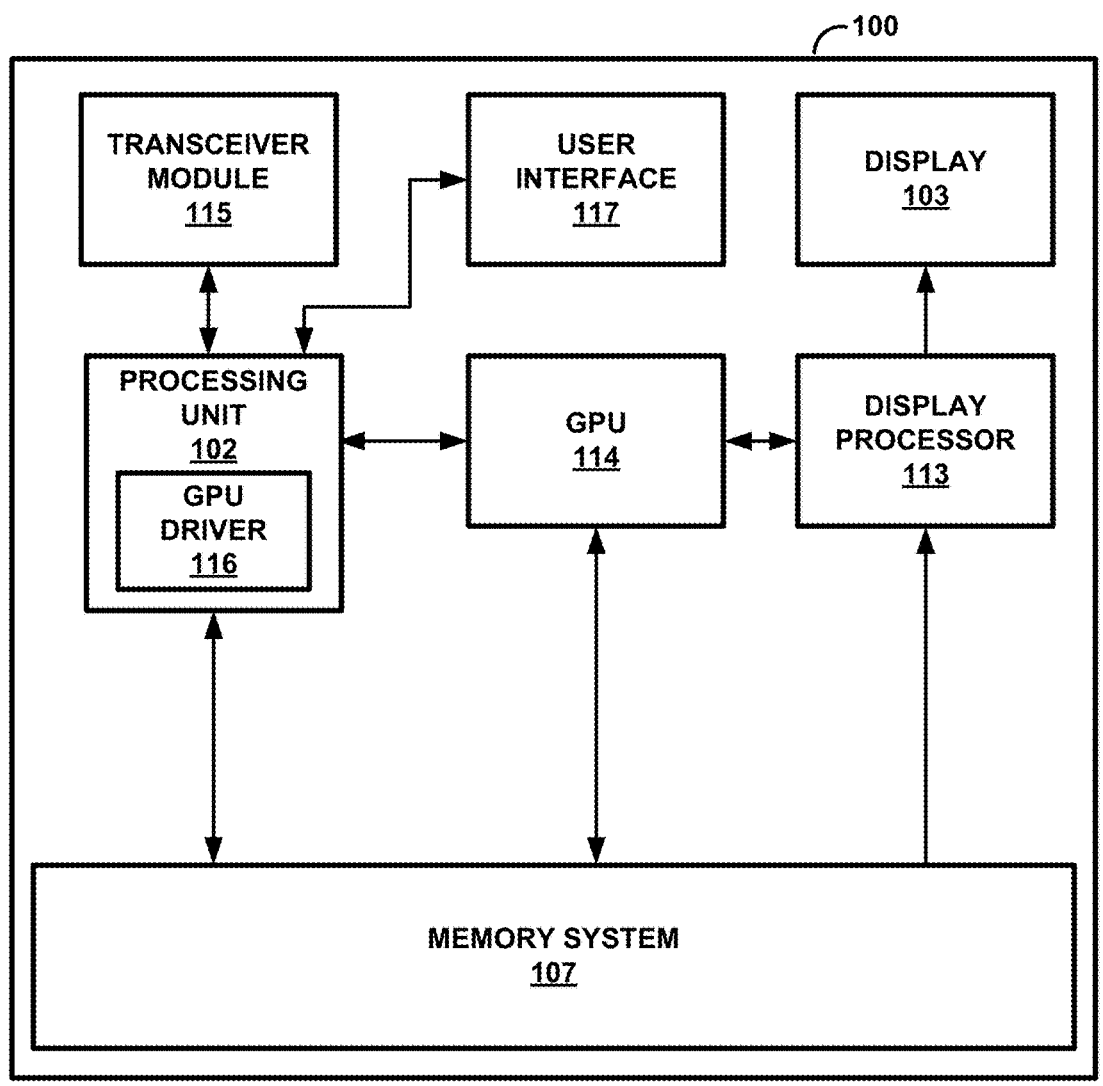
FIG. 1 is a block diagram illustrating an example computing device according to aspects of the disclosure.

FIG. 1 is a block diagram illustrating an example computing device configured to implement the adaptive memory address scanning techniques of this disclosure. As shown in FIG. 1, device 100 may include display 103, processing unit 102, graphics processing unit (GPU) 114, memory system 107, display processor 113, transceiver module 115, and user interface 117. Examples of device 100 may include, but are not limited to, video devices such as media players, set-top boxes, wireless handsets such as mobile telephones, personal digital assistants (PDAs), desktop computers, laptop computers, gaming consoles, video conferencing units, tablet computing devices, and the like.

Processing unit 102 may include one or more programmable processors, such as, but not limited to, a central processing unit (CPU), a co-processor, and the like. GPU 114 may be configured to perform graphics related functions such as determining pixel values for pixels of display 103, which may be part of device 100 or coupled to device 100, and render the pixels of the display. For example, processing unit 102 may execute an application stored in memory system 107, such as a video game, a web browser, an e-mail application, or any other application that creates graphics that are to be presented. Processing unit 102 may instruct GPU 114 to perform graphics-related functions to determine the pixel values such as color values, opacity values, and other such values for the graphics created by the execution of the application. In response, GPU 114 may perform the graphics-related functions and render the pixels of the display based on the determined pixel values.

Graphics processing unit (GPU) driver 116 may function as the interface between processing unit 102 and GPU 114 that allows processing unit 102 to instruct GPU 114 to perform graphics related functions. For example, if processing unit 102 needs to transmit a command or an instruction to GPU 114, processing unit 102 may transmit the command or instruction to GPU 114 through GPU driver 116. The commands or instructions that processing unit 102 may transmit to GPU 114 may include commands to load and execute instructions of shader programs such as vertex shaders and fragment shaders, and commands indicating virtual memory addresses where GPU 114 may retrieve pixel values from or store pixel values into memory system 107. In this manner, processing unit 102 may control the operation of GPU 114.

The virtual addresses that GPU 114 utilizes to retrieve or store pixel values may be part of a virtual memory scheme that keeps the actual locations of where the pixel values are stored or being retrieved from "hidden" from GPU 114. For example, virtual memory is a memory management technique that virtualizes memory system 107 so that GPU 114 may need only to refer to the virtual addresses for retrieving and storing pixel values. In these examples, GPU driver 116 of processing unit 102 may transmit the virtual addresses to GPU 114 that indicate to GPU 114 where to store the pixel values or from where to retrieve the pixel values.

Examples of memory system 107 include, but are not limited to, one or more memory units comprising random access memory (RAM), synchronous dynamic RAM (SDRAM), double data rate SDRAM (DDR SDRAM), read only memory (ROM), electrically erasable programmable read-only memory (EEPROM), flash memory, or any other medium that can be used to store data (e.g., data associated with a surface rendered by GPU 114). Memory system 107 may also be configured to store program code in the form of instructions or data structures and that can be accessed by processing unit 102 and GPU 114. In some examples memory system 107 may comprise one or more computer-readable storage media, such as a computer-readable storage device. For instance, memory system 107 may include instructions that cause processing unit 102 and GPU 114 to perform the functions ascribed to them in this disclosure.

Memory system 107 may, in some examples, be considered as a non-transitory storage medium. The term "non-transitory" may indicate that the storage medium is not embodied in a carrier wave or a propagated signal. However, the term "non-transitory" should not be interpreted to mean that memory system 107 is non-movable. As one example, memory system 107 may be removed from device 100, and moved to another device. As another example, a storage device, substantially similar to memory system 107, may be inserted into device 100. In certain examples, a non-transitory storage medium may store data that can, over time, change (e.g., in RAM).

GPU driver 116 may be software that is executing on processing unit 102. In this example, memory system 107 stores the source code or object code of GPU driver 116 that processing unit 102 retrieves for execution. Alternatively, GPU driver 116 may be hardware embedded within processing unit 102, or hardware external to processing unit 102 that couples to processing unit 102 and GPU 114. In some examples, GPU driver 116 may be hardware, software, firmware, and the like, including any combination thereof. For purposes of illustration and clarity, the examples described in this disclosure are described in context of GPU driver 116 being software executing on processing unit 102.

Device 100 may include additional modules or units not shown in FIG. 1 for purposes of clarity. For example, device 100 may include a speaker and a microphone, neither of which are shown in FIG. 1, to effectuate telephonic communications in examples where device 100 is a mobile wireless telephone or a speaker where device 100 is a media player. Device 100 may also include a video camera. Furthermore, the various modules and units shown in device 100 may not be necessary in every example of device 100. For example, user interface 117 and display 103 may be external to device 100 in examples where device 100 is a desktop computer or other device that is equipped to interface with an external user interface or display.

Examples of user interface 117 include, but are not limited to, a trackball, a mouse, a keyboard, and other types of input devices. User interface 117 may also be a touch screen and may be incorporated as a part of display 103. Transceiver module 115 may include circuitry to allow wireless or wired communication between device 100 and another device or a network. Transceiver module 115 may include modulators, demodulators, amplifiers and other such circuitry for wired or wireless communication.

Display 103 may be the display of device 100 that displays the image content generated by GPU 114. For example, during a rasterization process, GPU 114 may divide display 103 into display tiles, and render corresponding portions of an image into each one of the display tiles. Display 103 may be a liquid crystal display (LCD), an organic light emitting diode display (OLED), a cathode ray tube (CRT) display, a plasma display, or another type of display device.

In accordance with the techniques of this disclosure, device 100, including GPU 114, may be configured to perform a memory accessing method for graphics processing. In one example, GPU 114 may be configured to determine properties of a surface, determine a memory address scanning technique based on the determined properties of the surface, and perform at least one of a read or a write of data associated with the surface in a memory based on the determined memory address scanning technique.

Figure 2:
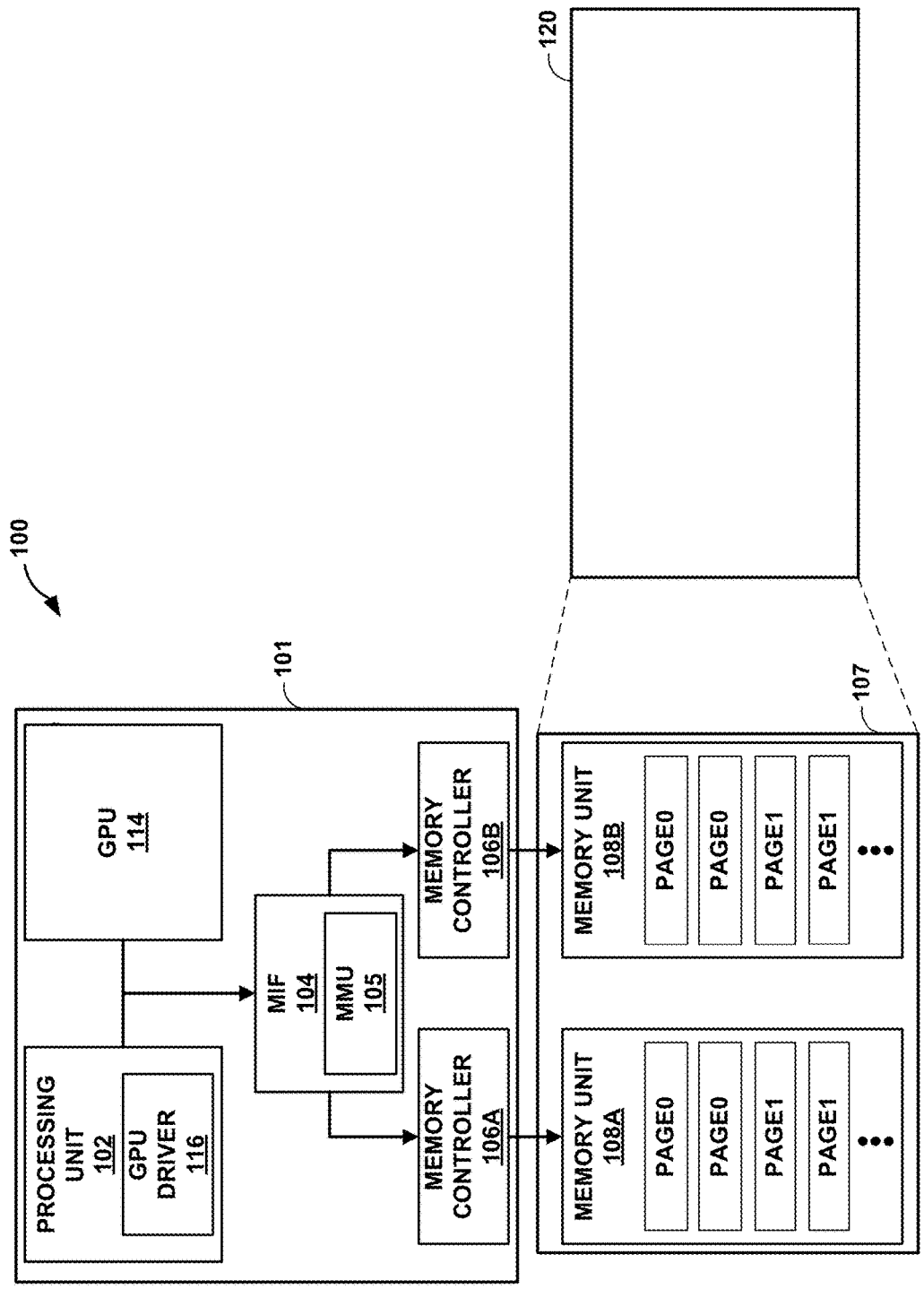
FIG. 2 is a block diagram illustrating an example of the computing device of FIG. 1 according to some examples of the disclosure.

FIG. 2 is a block diagram illustrating an example of aspects of the computing device of FIG. 1 according to some examples of the disclosure. For example, FIG. 2 may show device 100 of FIG. 1 in greater detail. For purposes of brevity, only the components of device 100 that are illustrated in FIG. 2, but not illustrated in FIG. 1 are described in detail below. As shown in FIG. 2, device 100 may further include memory interface unit (MIF) 104, memory management unit (MMU) 105, memory controller 106A, and memory controller 106B. Processing unit 102 and GPU 114 may store data in and retrieve data from memory system 107 via MIF 104, MMU 105, and memory controllers 106A and 106B. Processing unit 102, GPU 114, and memory system 107, as shown in FIG. 2, may be substantially similar to those shown in FIG. 1.

In some examples, device 100 may include integrated circuit (IC) 101, and IC 101 may include processing unit 102, GPU 114, MIF 104, MMU 105, memory controller 106A, and memory controller 106B. In some examples, transceiver module 115 and display processor 113 of FIG. 1 may both be part of IC 101, may both be external to IC 101, or one may be part of IC 101 and the other external to IC 101. Although FIG. 2 illustrates GPU 114 and processing unit 102 residing in a common package (e.g., a common hardware chip or integrated circuit), aspects of this disclosure are not so limited. In some examples, processing unit 102 may be external to IC 101. Furthermore, in the examples where processing unit 102 is external to IC 101, GPU 114 may include MIF 104 and memory controllers 106A and 106B; however, this is not a requirement in every example where processing unit 102 is external to the package.

Thus, in some examples, processing unit 102, GPU 114, MIF 104, and memory controllers 106A and 106B may be individual hardware chips, and IC 101 may include the combination of these hardware chips. In other examples, one hardware chip may include one or more of processing unit 102, MIF 104, and memory controllers 106A and 106B, and another hardware chip may include GPU 114. In such examples, IC 101 may include both of these two hardware chips. Other such permutations and combinations may be possible, including the example illustrated in FIG. 2 where processing unit 102, GPU 114, MIF 104, and memory controllers 106A and 106B are illustrated to be in a common package. In addition, IC 101 may include additional components than those shown in FIG. 2, such as a video coder or other suitable components.

IC 101 may be a specialized hardware unit designed for specific purposes, such as rendering graphics with specific performance criteria, such as massive parallel processing capabilities to render graphics in an accelerated fashion. In some instances, IC 101 may include specialized hardware in combination with a digital signal processor (DSP), a general purpose microprocessor, an application specific integrated circuit (ASIC), a field programmable gate array (FPGA), or other equivalent integrated or discrete logic circuitry. For example, GPU 114 may be specialized hardware, and processing unit 102 may be a DSP, a general purpose microprocessor, an ASIC, an FPGA, or any other suitable hardware.

As indicated above, GPU 114 may store pixel values into, and retrieve pixel values from, memory system 107. For accessing memory system 107, GPU 114 may use MIF 104 and memory controllers 106A and 106B. MIF 104 and memory controllers 106A and 106B may be hardware, software, firmware, and the like, including any combination thereof.

In some examples, MIF 104 may provide an interface between processors, such as processing unit 102 and GPU 114, and memory system 107. MIF 104 may include MMU 105, which may handle requests for access to memory system 107 from processing unit 102, including performing translations of logical memory addresses to physical memory addresses in memory system 107 as well as performing other tasks. Memory controllers 106A and 106B may regulate the flow of data in and out of respective memory units 108A and 108B. Each one of memory controllers 106A and 106B may provide access to a corresponding one of memory units 108A and 108B of memory system 107. Each one of memory units 108A and 108B may be distinct portions of memory system 107 that are separately accessible. In this context, memory unit 108A may be considered as a separate memory "channel" from memory unit 108B. Memory system 107 may include a plurality of memory units 108A and 108B, and access to memory units 108A and 108B is provided by a corresponding one of memory controllers 106A and 106B.

In some examples, one of memory units 108A and 108B may be accessible via only its corresponding one of memory controllers 106A and 106B, and via no other memory controllers. For example, if memory controller 106A corresponds to memory unit 108A, then memory unit 108A may only be accessible via memory controller 106A, and memory controller 106B may not be able to access memory unit 108A. In this way, each one of memory controllers 106A and 106B provides a memory channel to memory system 107 via corresponding memory units 108A and 108B.

While aspects of this disclosure are described with device 100 including two memory controllers 106A and 106B, and memory system 107 including two memory units 108A and 108B, in some other examples device 100 may include more than two memory controllers, such as four memory controllers. In other examples, memory system 107 may include more than two memory units, such as four memory units, and the techniques described in this disclosure may be extendable to such examples as well. In examples where memory system 107 includes two memory units, memory system 107 may be referred to as a dual-channel memory system because there are two channels provided by two memory controllers 106A and 106B to two memory units 108A and 108B in memory system 107, respectively.

MIF 104 may be the interface that allows GPU 114 and processing unit 102 to access data (e.g., pixel values) from memory units 108A and 108B via memory controllers 106A and 106B, respectively. For example, MIF 104 may include MMU 105 that maps virtual memory addresses into physical memory addresses. For instance, to store pixel values into or retrieve pixel values from a particular memory address within memory system 107, GPU 114 may output a virtual memory address associated with the particular memory address to MIF 104. MMU 105 of MIF 104 may determine the particular memory address from the virtual memory address, and access the particular memory address in memory system 107. In the present disclosure, the terms "logical" and "virtual" may be used interchangeably when referring to memory and memory addresses, so that a virtual page may also be referred to as a logical page, a virtual memory address may also be referred to as a logical memory address, a virtual memory space may also be referred to as a logical memory space, and so on.

The virtual memory space may be divided into a plurality of virtual pages. These virtual pages may be contiguous, but the physical pages (e.g., page0 and page1) in memory system 107 to which these virtual pages correspond may not be contiguous in memory system 107. Pages may be considered as the minimum units that MIF 104 may be able to manage. Each virtual page may be further sub-divided into a plurality of banks. Each bank represents a logical unit of storage within the page. A bank may comprise multiple rows and columns of storage units and may point to one or more different memory units (e.g., across multiple memory channels). Typically, in a single read or write action, only one bank of a virtual page of memory is accessed at a time. In some examples, the size of the bank is equal to the size of the memory bus width.

As part of the graphics related functions, GPU 114 may generate a surface of graphics image or content, such as surface 120, that is to be shown on the display associated with or on device 100. GPU driver 116 may transmit instructions that cause GPU 114 to store the surface in memory system 107, and the virtual addresses as to where GPU 114 is to store the surface. Each surface may include pixel values that are stored in memory system 107.

Surface 120 may be arranged as a two dimensional (2D) array of pixel values, and GPU 114 may instruct MIF 104 to store the surface 120 or a number of surfaces in a linear, tiled or macro-tiled storage mode in memory system 107. In a linear storage mode, data (e.g., pixel data) is arranged into lines. In a tiling storage mode, pixel data is arranged into rectangular blocks. In a macro-tiling storage mode, pixel data is arranged into blocks, each block including multiple rectangular sub-blocks (i.e., tiles within tiles). In general, the tiling or macro-tiling storage mode may be generally referred to as being a tiling storage mode. In some examples, the 2D array of pixel values of surface 120 may be approximately the same size as the number of pixels on the display. For example, the pixel values of surface 120 may represent the graphics image generated by GPU 114. In other examples surface 120 may be a portion of the image that is displayed. That is, the displayed image may comprise one or more surfaces.

As one example, GPU driver 116, executing on processing unit 102, may transmit instructions that cause GPU 114 to store each line of surface 120, which is then stored in memory system 107, where a line encompasses pixel values across one row of surface 120. As another example, GPU driver 116 may transmit instructions to cause GPU 114 to store each tile of the surface, referred to as surface tile, which is then stored in memory system 107, where a tile encompasses M×N pixel values of the surface. In other examples of the disclosure, GPU 114 itself may determine the storage mode to be used for storing pixel data without any input from GPU driver 116. In general, this disclosure may generally refer to storing portions of a surface, which may refer to storing a surface in linear or tiled fashion. In one example, to store the surface in either the linear or tiled fashion, GPU driver 116 may transmit instructions that cause GPU 114 to store the pixel values at virtual addresses. MMU 105 of MIF 104 may determine the physical addresses that correspond to the virtual addresses, and GPU 114 through MIF 104 may store the pixel values at the pages of memory system 107 that correspond to the physical addresses.

Figure 3:
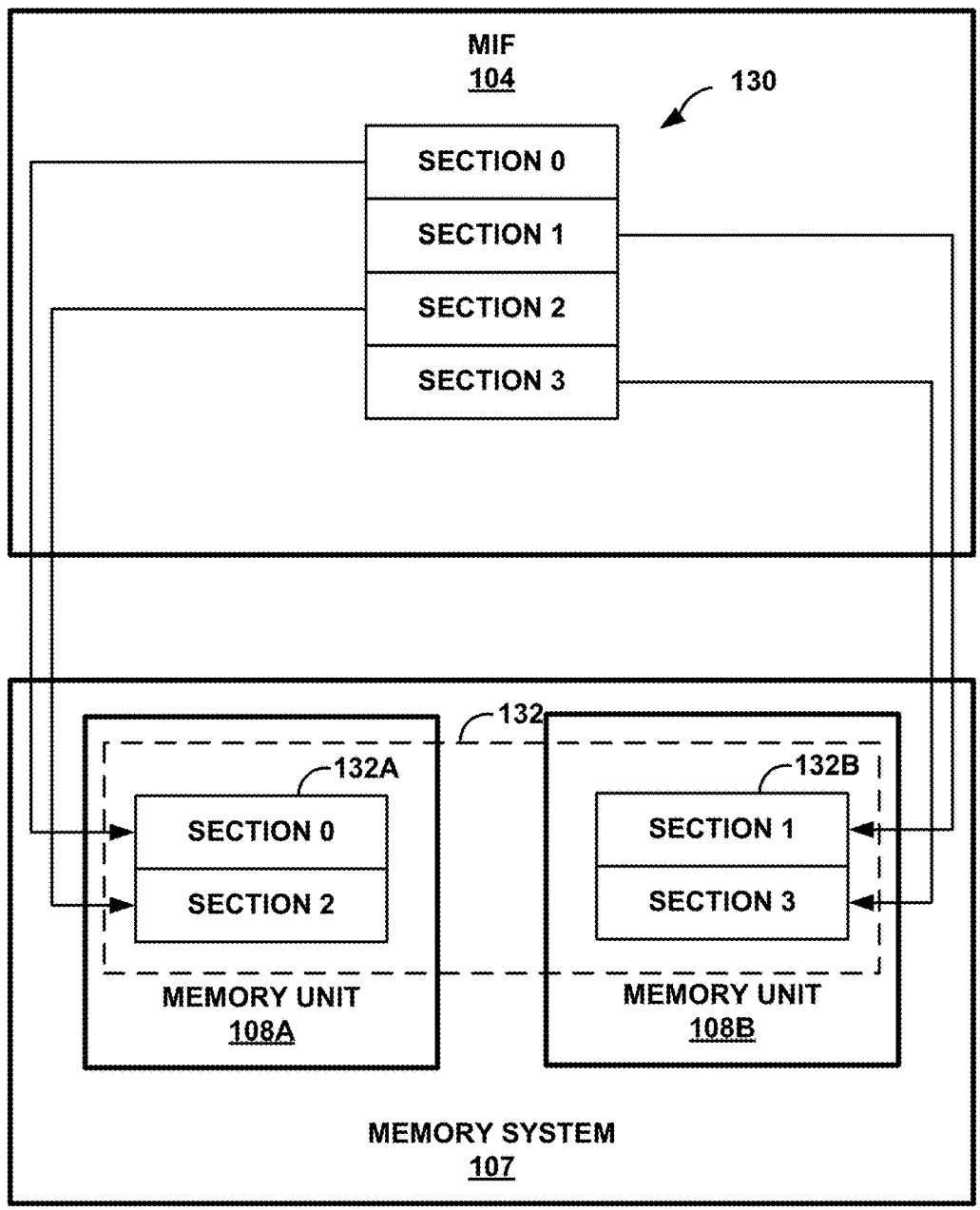
FIG. 3 is a block diagram illustrating another example of the computing device of FIG. 1 according to some examples of the disclosure.

In aspects of this disclosure, a physical page mapped from a virtual page may encompass both memory unit 108A and memory unit 108B, as illustrated in more detail in FIG. 3. FIG. 3 is a block diagram illustrating an example physical page of memory system 107. For example, FIG. 3 illustrates MIF 104 including a virtual page 130 which includes four sections (sections 0-3). It should be understood that virtual page 130 is a virtual construct that is illustrated in FIG. 3 for ease of understanding. In FIG. 3, memory system 107 may include a physical page 132 that corresponds to virtual page 130.

Physical page 132 may encompass both memory unit 108A and memory unit 108B. For example, memory unit 108A may store a portion of physical page 132, indicated as portion 132A, and memory unit 108B may store a portion of physical page 132, indicated as portion 132B. As illustrated, memory unit 108A stores section 0 and section 2 of physical page 132, and memory unit 108B stores section 1 and section 3 of physical page 132.

Memory unit 108A may store section 0 and section 2, and memory unit 108B may store section 1 and section 3 because of IC 101 storing data in an interleaving manner. For instance, referring back to FIG. 1, GPU driver 116 may transmit instructions that cause GPU 114 to store pixel values, and may transmit the virtual addresses for where the pixel value are to be stored. GPU 114, in turn, may request MIF 104 to store the pixel values in accordance with the virtual addresses. MIF 104, in turn, may map the virtual addresses to physical addresses and store the pixel values in pages of memory system 107 in an interleaving manner based on the physical addresses.

MIF 104 may be configured to store the pixel values in an interleaving manner. As one example, MIF 104 may be pre-programmed to store the pixel values in the interleaving manner. As another example, MIF 104 may receive instructions that instruct MIF 104 to store the pixel values in the interleaving manner. MIF 104 may interleave between memory controllers 106A and 106B to store the pixel values in pages of memory system 107. The interleaving manner of storage refers to storing a first set of bytes, where one byte is eight bits, in memory unit 108A via memory controller 106A, followed by storing a second set of bytes in memory unit 108B via memory controller 106B, followed by storing a third set of bytes in memory unit 108A via memory controller 106A, followed by storing a fourth set of bytes in memory unit 108B via memory controller 106B, and so forth. In other words, the interleaved manner of storage may be considered as alternating the storage of bytes in memory unit 108A and memory unit 108B via respective memory controllers 106A and 106B. The number of bytes that are stored per interleave cycle may be referred to as an interleave granularity, and may be defined by GPU driver 116, or MIF 104 may be preprogrammed with the interleave granularity.

For example, in the example illustrated in FIG. 3, physical page 132 (mapped from virtual page 130) may be able to store 4096 bytes of pixel values (e.g., 4 kilobytes (kB) of pixel values), which means that each one of sections 0-3 can store 1024 bytes of pixel values (e.g., 1 kB of pixel values). Also, assume that the interleave granularity is 1024 bytes. In this example, GPU 114 may store the pixel values through MIF 104 such that a first 1 kB of pixel values of a line or tile of the surface is stored in section 0 in memory unit 108A via memory controller 106A, and such that a second 1 kB of pixel values of the line or tile of the surface is stored in section 1 in memory unit 108B via memory controller 106B, due to the interleave granularity of 1 kB. Also, GPU 114 may store the pixel values through MIF 104 such that a third 1 kB of pixel values of the line or tile of the surface is stored in section 2 in memory unit 108A via memory controller 106A, and such that a fourth 1 kB of pixel values of the line or tile of the surface is stored in section 3 in memory unit 108B via memory controller 106B, due to the interleave granularity of 1 kB.

Although the above example describes storage of pixel values in pages (e.g., physical page 132 or virtual page 130), aspects of this disclosure are not so limited. For example, it may not be necessary that memory system 107 is divided into a plurality of physical pages. Even in these examples, GPU driver 116 may cause GPU 114 to store pixel values through MIF 104 in the interleaving manner. In these examples, the storage bits within memory system 107 may be considered as contiguous storage locations; however, contiguous storage may not be necessary in every example. As an example, where memory system 107 is not necessarily divided into physical pages, GPU 114 may store the pixel values through MIF 104 such that a first 1 kB of pixel values of a line or tile of the surface is stored in memory unit 108A via memory controller 106A, and such that a second 1 kB of pixel values of the line or tile of the surface is stored in memory unit 108B via memory controller 106B, due to the interleave granularity of 1 kB. Also, GPU 114 may store pixel values through MIF 104 such that a third 1 kB of pixel values of the line or tile of the surface is stored in memory unit 108A via memory controller 106A, and such that a fourth 1 kB of pixel values of the line or tile of the surface is stored in memory unit 108B via memory controller 106B, due to the interleave granularity of 1 kB. For ease of description, various examples are described with examples where memory system 107 includes pages such as physical page 132.

For purposes of illustration, this disclosure describes storing bytes of pixel values. A byte is equal to 8 bits. Accordingly, storing 1024 bytes is equivalent to storing 8192 bits, where a bit may be a digital value of 0 or a digital value of 1. Therefore, although this disclosure describes storing bytes of pixel values, the techniques described in this disclosure are equivalent to storing bits of pixel values, where each byte is 8 bits.

In the example where memory system 107 includes physical page 132, the interleave granularity causes half of the physical page 132 to be stored in memory unit 108A and the other half of the physical page 132 to be stored in memory unit 108B. Such interleave storage may promote efficient channel utilization. For example, the interleave granularity may cause MIF 104 to store half the pixel values using the channel established by memory controller 106A, and store half the pixel values using the channel established by memory controller 106B. Such storage of half the pixel values using the channel established by memory controller 106A and half the pixel values using the channel established by memory controller 106B may occur even in examples where memory system 107 is not divided into pages.

Also, storing pixel values in the interleaved storage manner may allow GPU 114 to store pixel values via MIF 104 in memory system 107 in parallel. For example, GPU 114 may be able to store pixel values via MIF 104 in section 0 of portion 132A of physical page 132 within memory unit 108A via memory controller 106A at the same time or substantially the same time (e.g., in parallel) that GPU 114 may be able to store pixel values via MIF 104 in section 1 of portion 132B of physical page 132 within memory unit 108B via memory controller 106B. Similar to above, the storage of pixel values within memory unit 108A via memory controller 106A occurring at the same time as the storage of pixel values within memory unit 108B via memory controller 106B may also occur even in examples where memory system 107 is not divided into pages.

As mentioned above, conventional techniques for efficiently using memory in graphics processing are generally sub-optimal for the different surface types that may be encountered. In view of these drawbacks, this disclosure proposes the use of an adaptive memory address scanning technique to improve memory efficiency. The adaptive memory address scanning techniques of this disclosure may define an address scanning pattern, to be used for a particular surface based on one or more properties of a surface.

Figure 4:
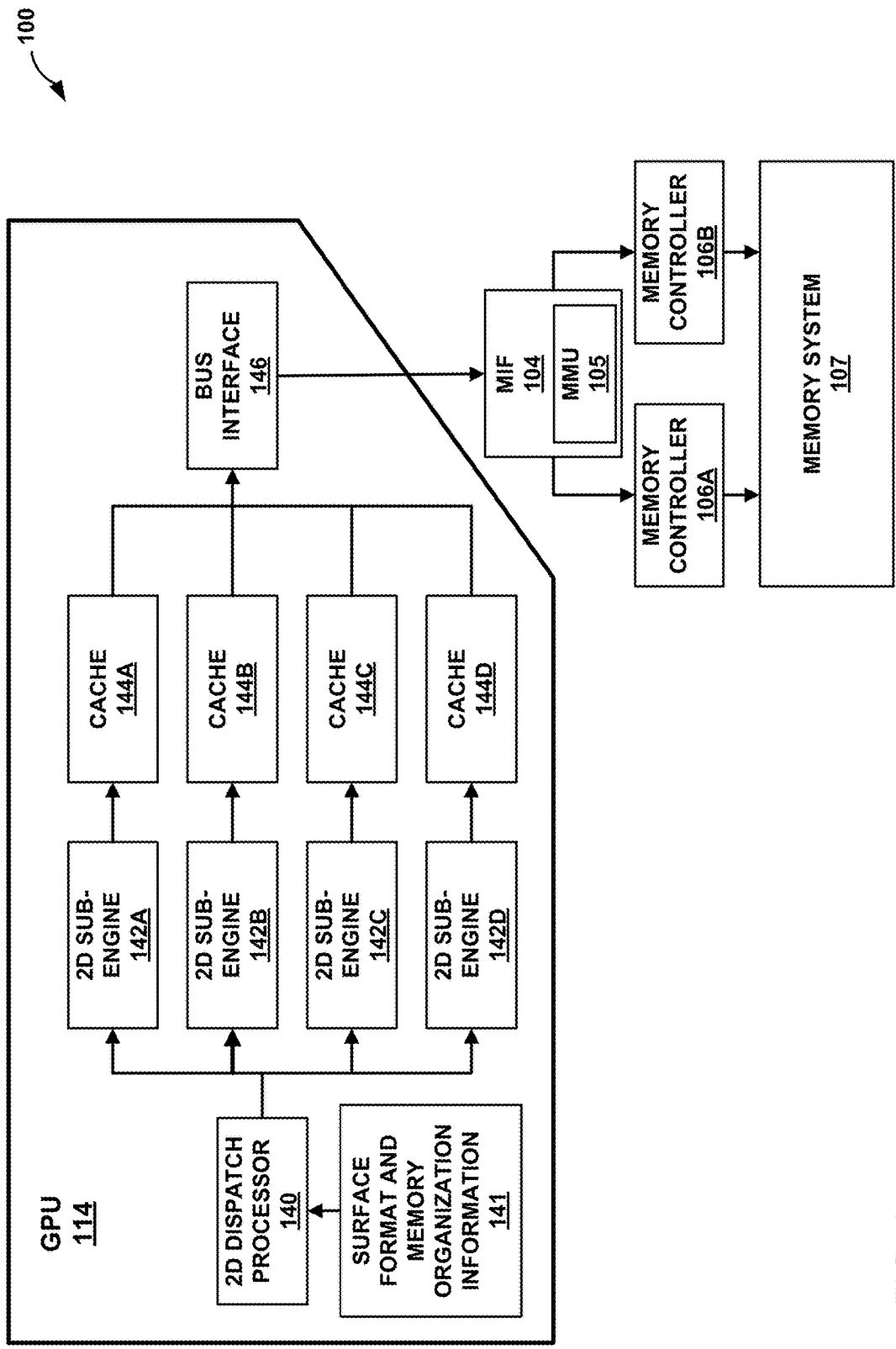
FIG. 4 is a block diagram illustrating an example graphics processing unit (GPU) and other hardware of the computing device of FIG. 1 in more detail.

FIG. 4 is a block diagram illustrating an example graphics processing unit (GPU) and other hardware of the device 100 of FIG. 1 in more detail. In particular, FIG. 4 depicts, in more detail, the hardware units of GPU 114 that may be configured to implement the techniques of the disclosure.

GPU 114 may include a 2D dispatch processor 140, 2D sub-engines 142A-D ("2D sub-engines 142"), caches 144A-D ("caches 144") and bus interface 146. 2D dispatch processor 140 is a processor within GPU 114 that may be configured to instruct and/or otherwise control the operation of 2D sub-engines 142 to perform a variety of 2D operations on a surface. Example 2D operations include block transfer (BLT operations), clear operations, blending operations, format conversions, rotations, scaling, and other geometric operations. A BLT operation is an operation where data is copied from one memory to another. A clear operation may be used to initialize a surface by assigning a particular color value to the pixels of the surface. A blending operation is an operation whereby pixel values from two surfaces are combined in a way (e.g., based on a transparency value) to create a new surface. A format conversion is an operation where pixel values in one color format (e.g., RGB) are converted to pixel values in another color format (e.g., YUV). A rotation operation is an operation where a surface is rotated by some angular amount (e.g., 90 degrees, 180 degrees, etc.). A scaling operation is an operation where the size of a surface may be made larger or smaller. In some examples, a scaling operation may maintain an original aspect ratio of a surface. In other examples, a scaling operation may alter the original aspect ratio of a surface. The 2D operations discussed above may involve reads from memory (e.g., read-only operations), writes to memory (e.g., write-only operations), and/or both read and write operations (e.g., operations that involve both reading from, and writing to, memory).

2D sub-engines 142 are specialized hardware units configured to perform the 2D operations on a surface. In general, the parallel arrangement of 2D sub-engines 142 as depicted in FIG. 4 may be referred to as a single 2D engine (i.e., along with 2D dispatch processor 140 and caches 144). More generically, in the context of this disclosure, each of 2D sub-engines 142 may be referred to as a parallel address scanning engine. The techniques of this disclosure may be applied to a source surface and/or a destination surface. A source surface is the surface on which 2D sub-engines 142 are performing an operation. The destination surface is the surface created by 2D sub-engines through performance of the operation on the source surface. 2D sub-engines 142 may use respective caches 144 to temporarily store pixel data before storing the pixel data in memory system 107. Caches 144 may be configured as fast graphics memory (GMEM) that is physically located on the same IC as GPU 114. In one example, each of caches 144 may have multiple cache lines (e.g., 32 cache lines), of which may store 2 k bits of data. However, other sizes of caches 144 may be used. In some examples, the size of caches 144 may be chosen based on the size in bits of a compressed pixel block. Of course, the size of a compressed pixel block in bits may depend on the pixel density (in bits per pixel) and the compression algorithm used.

Figure 5:
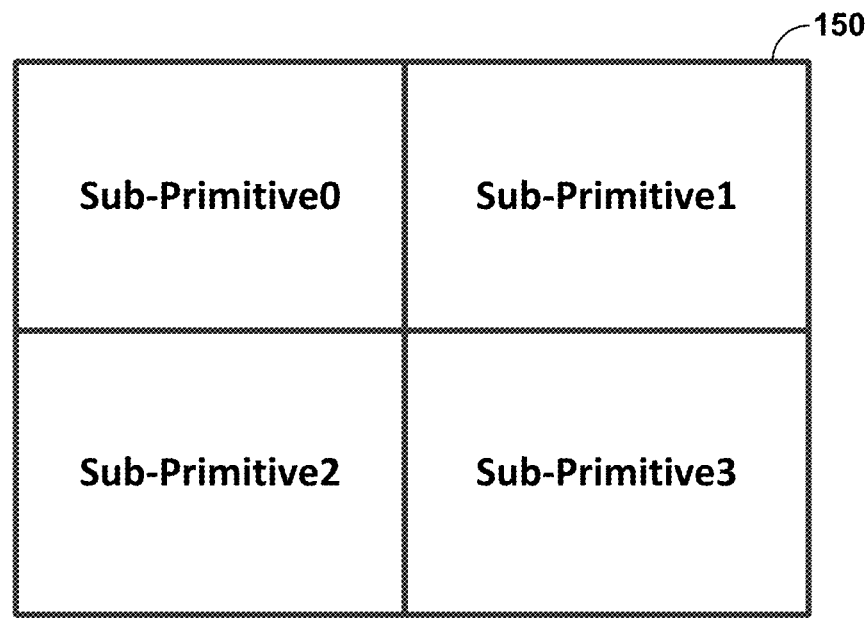
FIG. 5 is a conceptual diagram of a two-dimensional (2D) surface according to one example of the disclosure.

In the example of FIG. 4, four 2D sub-engines 142 and four caches 144 are depicted. In this example, four sections (or sub-primitives of a surface) may be operated on in parallel by 2D sub-engines 142. In another example, 2D sub-engines 142 may be configured to operate on four different surfaces. However, more or fewer 2D sub-engines may be used. FIG. 5 is a conceptual diagram of a two-dimensional (2D) surface 150 that has been divided into four sub-primitives (i.e., sub-primitive0, sub-primitive1, sub-primitive2, and sub-primitive3).

Returning to FIG. 4, 2D sub-engines 142 may be configured to read and/or store pixel data associated with a surface in memory system 107. In one example, 2D sub-engines 142 store the pixel data through MIF 104. MIF 104 may be accessed through bus interface 146. For storage operations, bus interface 146 collects pixel data from all of 2D sub-engines 142 and sends the pixel data to MIF 104 for storage. For read operations, bus interface 146 forwards read requests to MIF 104 and receives the pixel data back in response to the read requests. Bus interface 146 may then route the retrieved pixel data to the appropriate one of caches 144 for further operation by a respective one of 2D sub-engines 142.

In accordance with the features of this disclosure, GPU 114 may be configured to determine properties of a surface, determine a memory address scanning technique based on the determined properties of the surface, and perform at least one of a read or a write of data associated with the surface in a memory based on the determined memory address scanning technique. In particular, 2D dispatch processor 140, or another hardware unit of GPU 114, may be configured to determine the properties of a surface from surface format and memory organization information 141. Surface format and memory organization information 141 may be information stored in registers, buffers, or other types of memory that indicate the properties of a surface. In some examples, the surface properties may be read from metadata associated with a surface (e.g., a surface description).

Examples of surface properties may include, but are not limited to, an 2D operation (or other graphics operations) to be performed on the surface, a storage mode, a surface height, a surface width, use of pixel compression or not, use of multi-sample anti-aliasing (MSAA), a pixel size, or a pixel color format. Storage mode may include one or more a linear storage mode and a tiling storage mode, including macro-tiling, as described above. A surface height is the height of a surface in pixels. A surface width is the width of a surface in pixels. Information concerning use of pixel compression indicates whether not the pixel data of a surface are compressed. The information concerning use of pixel compression may also indicate the type of compression used. Typically, schemes that compress pixel values will compress blocks of pixels at a time. The type of compression used may indicate the size of the block of pixels used to perform the compression (i.e., the compression block size). 2D sub-engines 142 would then access the compressed pixels per the compression block size. MSAA is a graphics processing technique, whereby multiple values (i.e., samples) at different locations are stored for each pixel (e.g., four pixel values per pixel, each at a different location). Pixel size indicates how many bits are used to represent each pixel (e.g., 8 bits per pixel (bpp), 16 bpp, 32 bpp, etc.). Pixel format may refer to the color format of a pixel. Example color formats includes, RGB, YCbCr, YUV, YUY2, AYB, NV12-4R, NV21-4R, and IYUV.

2D dispatch processor 140 may be configured to determine one or more of the aforementioned surface properties and determine a memory address scanning technique s based on the determined one or more surface properties. In examples of the disclosure discussed below, memory address scanning techniques may include dividing a surface into one or more blocks called sub-primitives and determining a starting scan position in each of the one or more sub-primitives, selecting a scanning pattern for the one or more sub-primitives, and/or selecting a number of 2D sub-engines 142 to perform a particular 2D operation.

The following are example properties of a surface that 2D dispatch processor 140 may determine in order to determine the memory address scanning technique to be used by 2D sub-engines. As a first example, 2D dispatch processor 140 may be configured to determine a width and/or height of a surface. Depending on the determined width and/or height the surface, 2D dispatch processor 140 may instruct 2D sub-engines 142 to divide a surface into smaller sub-primitives. Instead of reading pixel data of the surface from a single starting point in memory to the end, 2D sub-engines 142 may be configured to read and/or write pixel data of a surface data from multiple starting points in memory. Multiple sub-primitives, and thus multiple starting addresses, allow for read/writes to happen in parallel, thus more fully utilizing available memory bandwidth.

In another example of the disclosure, 2D sub-engines 142 may be configured to adaptively divide a surface into varying numbers of sub-primitives based on the size (e.g., total number of pixels) and/or pixel format (i.e., the number of bits per pixel). In this way, the sub-primitives of the surface may be assigned to different memory pages and/or memory banks.

In another example of the disclosure, based on the storage mode and surface size, 2D sub-engines 142 may be configured to divide the surface into sub-primitives of various shapes, including horizontally arranged sub-primitives (e.g., a 4×1 or 2×1 arrangement), vertically arranged sub-primitives (e.g., a 1×4 or 1×2 arrangement), squarely arranged sub-primitives (e.g., a 2×2 arrangement), or into a single surface (i.e., no sub-primitives). The shape of the arrangement may be varied in order to achieve better memory efficiency.

In another example, based on one or more of the above-mentioned surface properties, 2D sub-engines 142 may be configured to apply a scanning pattern for each of the sub-primitives determined using one of the techniques described above. In this context, the scanning pattern may indicate the starting address to scan in each sub-primitive, as well as the order in which to scan the remaining addresses within each primitive. General guidelines and specific examples of how the determined surface properties are used to determine a memory address scanning technique are described below with reference to FIGS. 6-14.

Figure 6:
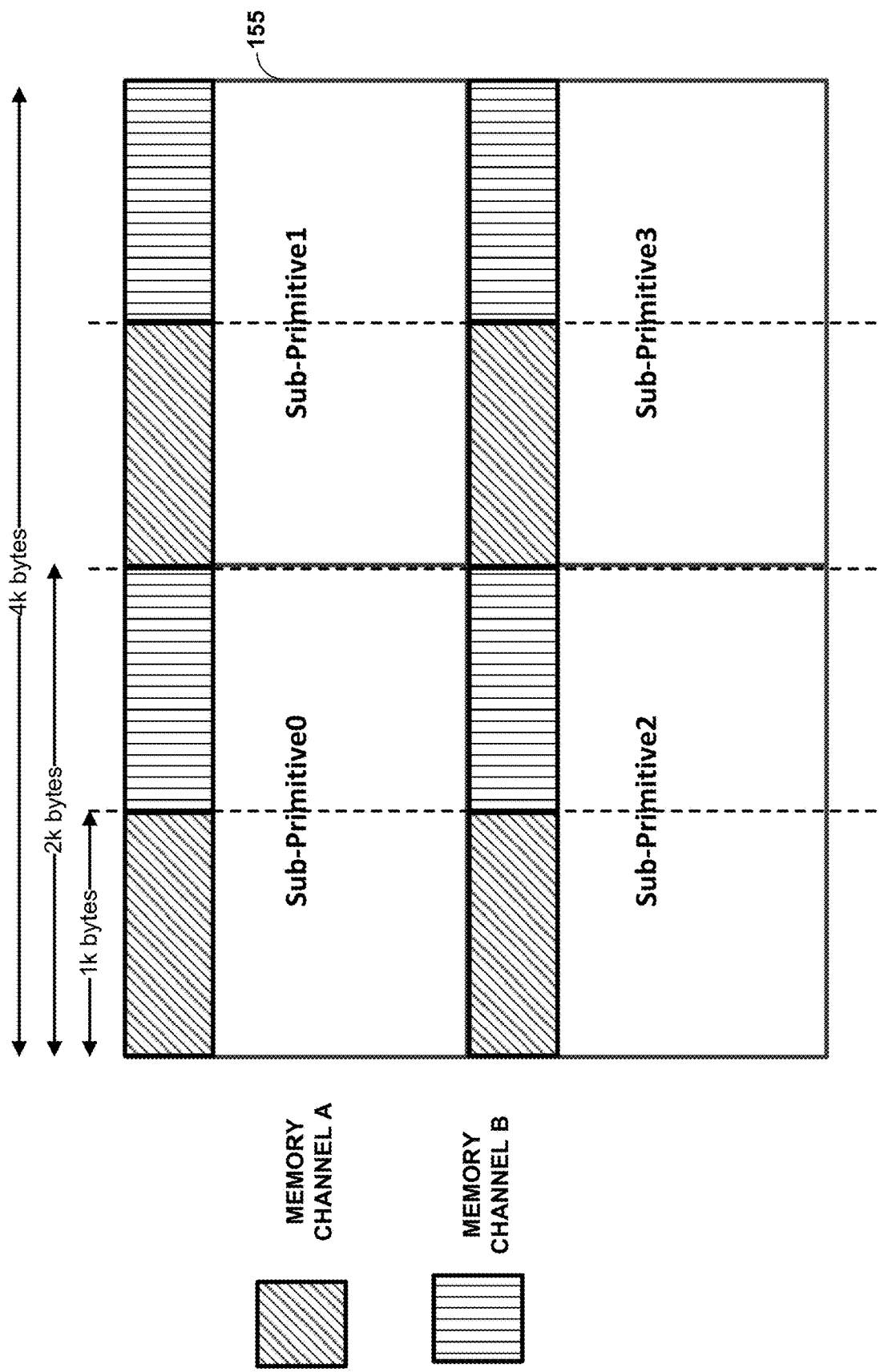
FIG. 6 is a conceptual diagram showing one example of address scanning.

FIG. 6 is a conceptual diagram showing one example of address scanning. As shown in FIG. 6, surface 155 has been divided into four sub-primitives, in a 2×2 arrangement. In this example, surface 155 has a surface size and pixel size such that the width of the surface is 4 k bytes. As such, each of sub-primitive 0-3 have a 2 k byte width. Surface 155 is stored in memory system 107 of FIG. 1. Similar to the example of FIG. 2, memory system 107 in the example of FIG. 6 is a two-channel memory system. In the example of FIG. 6, the two-channel memory system stores data in a 1 k byte interleaving pattern. Accordingly, as shown in each of the sub-primitives of FIG. 6, the left half of each of the sub-primitives is stored in memory channel A (e.g., memory unit 108A of FIG. 2) and the right half of each of the sub-primitives is stored in memory channel B (e.g., memory unit 108B of FIG. 2).

Using conventional memory address scanning techniques, such a division of surface 155 would lead to poor memory efficiency. This is because each of 2D sub-engines 142 would begin a scan of a respective sub-primitive in the upper left corner of the sub-primitive. As such, in the example of FIG. 6, each of 2D sub-engines 142 would read or write data for surface 155 using memory channel A at the same time. By the time a 2D sub-engine 142 reached data for memory channel B, all of 2D sub-engines 142 would be reading and/or writing from memory channel B. As such, channel balance is inefficient, as only 50% of memory units in memory system 107 would be used at any one time.

To alleviate this issue, the techniques of this disclosure use the above-mentioned properties of a surface to determine a more optimal division of a surface into sub-primitives. In particular, this disclosure proposes using the surface size as well as the storage mode (including the use of compression), to determine one or more optimal divisions of a surface into sub-primitives. The possible divisions include the number of sub-primitives as well as the shape of the arrangement. The examples shown in FIG. 7 below include the division of a surface into one sub-primitive (i.e., no division), two sub-primitives, and four sub-primitives. However, surfaces may be divided into any number of sub-primitives consistent with the guidelines discussed below.

In general, 2D dispatch processor 140 may be configured to determine the properties of a surface and determine how to divide the surface into sub-primitives. The division of the surface into sub-primitives may include both the number of sub-primitives and the shape of the arrangement of the sub-primitives. The number and shape of the sub-primitives is one example of a determined memory address scanning technique. In accordance with the techniques of this disclosure, GPU 114 (e.g., through 2D dispatch processor 140) may be configured to determine the number and arrangement of sub-primitives such that a starting scan position of each sub-primitive does not use the same memory channel. As such, in addition to the surface properties, 2D dispatch processor 140 may further consider the memory channel width to determine a number and arrangement of sub-primitives.

In a further example of the disclosure, 2D dispatch processor 140 may further consider the size of caches 144 when determining the number and arrangement of sub-primitives when dividing a surface. For example, 2D dispatch processor 140 may be configured to divide a surface into sub-primitives such that the resultant size of the sub-primitives makes efficient use of caches 144. That is, if the size of the data in bytes of the sub-primitives is small relative to the size of caches 144, such a division would result in poor cache efficiency. For example, if a surface were divided into four sub-primitives and each of the sub-primitives included pixel data that was less than half the size of a cache 144 for a respective 2D sub-engine 142, cache efficiency would be poor. That is, more than half of each cache 144 would be unused for each operation. In this scenario, a division of the surface into two sub-primitives would be more optimal, as each of the two caches 144 that are used would be more fully utilized. Furthermore, only 2D sub-engines 142 would be needed, freeing up any additional 2D sub-engines 142 to perform additional operations.

Figure 7:
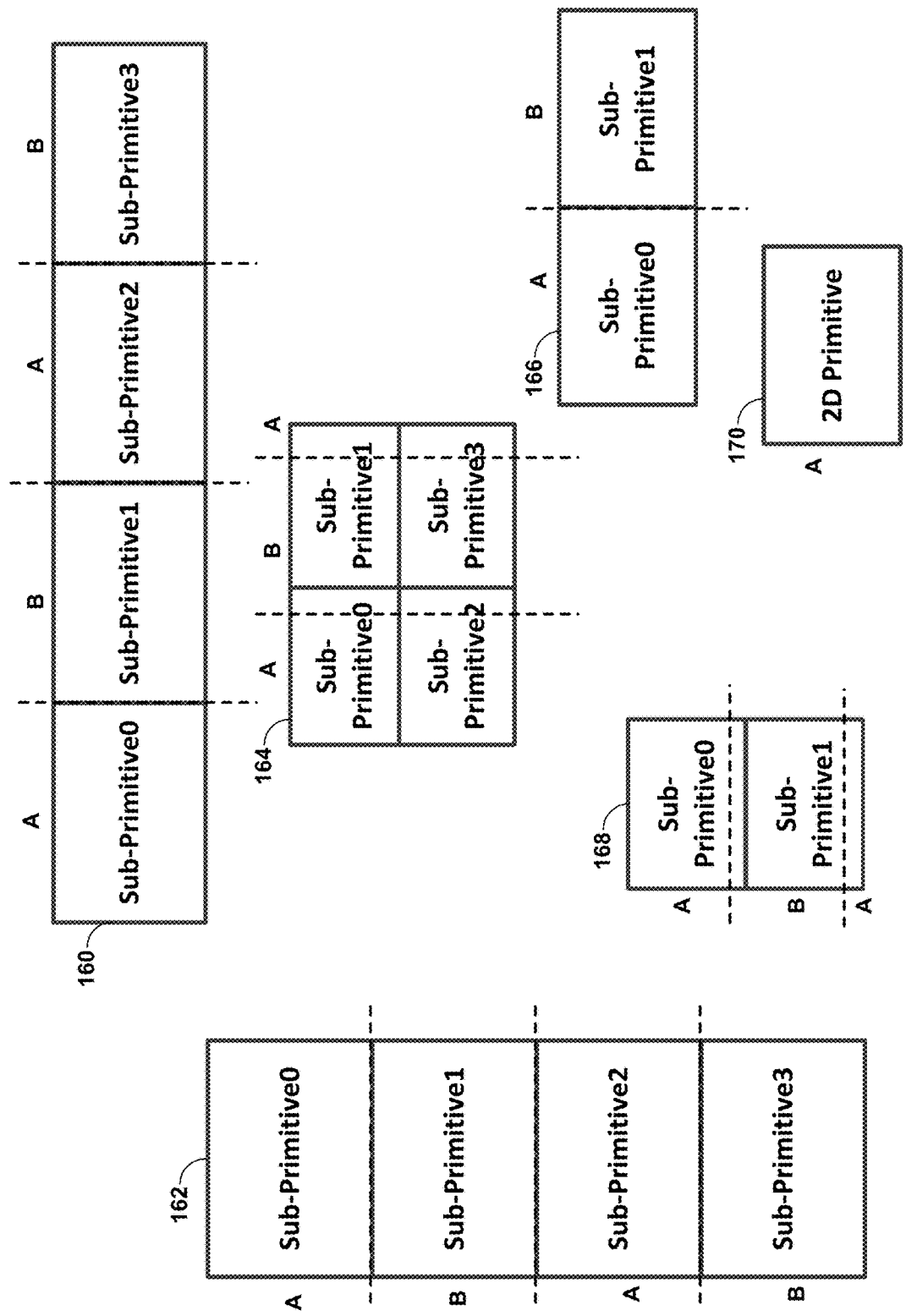
FIG. 7 is a conceptual diagram showing example surface shape arrangements according to examples of the disclosure.

FIG. 7 is a conceptual diagram showing example surface shape arrangements according to examples of the disclosure. In the example of FIG. 7, 2D dispatch processor 140 may be configured to divide each of the surfaces into a number and arrangement of sub-primitives based on the pseudo-code shown below:

```
if (compression enabled)
    if (width > 256)
        Vertical 4;
    else if (height > 128)
        Horizontal 4;
    else if (width > 64 & height > 16)
        Vertical 2, Horizontal 2
    else if (width > 64)
        Vertical 2;
    else if (height > 16)
        Horizontal 2;
    else
        Original;
else if (macro tiling or tiling)
    if ( clear \ blt )
        Original;
    else
        if (width > 64)
```

-continued

```
            Vertical 2;
        else if (height > 16)
            Horizontal 2;
        else
            Original;
    else // (linear)
        if ((edge of surface = channel boundary) && width > 256)
            Vertical 4;
        else
        if ( clear \ blt )
            Original;
        else
        if (width > 64)
            Vertical 2;
        else if (height > 16)
            Horizontal 2;
        else
            Original;
```

Starting with the first line of the pseudo-code above, the division of sub-primitives is first performed if the pixel data of the surface is compressed. If so, 2D dispatch processor 140 determines if the width of the surface is greater than some threshold (e.g., in terms of the number of pixels in the height and/or width of the surface). In this example, the threshold is 256 pixels. If the width of the surface is greater than 256 pixels, 2D dispatch processor 140 divides the surface into four vertical sub-primitives (Vertical 4), such as shown by surface 160 in FIG. 7. Again, as was mentioned above, the threshold may be chosen such that the resultant sub-primitives are large enough to make efficient use of caches 144. In the example of FIG. 7, surface 160 is divided into four vertical sub-primitives where the boundary of each of the sub-primitives falls on the boundary line of one channel of a two-channel memory system (denoted by the A and B). In this example, two of 2D sub-engines 142 would begin scanning in memory channel A, while the other two 2D sub-engines 142 would begin scanning in memory channel B. It should be noted that the example of surface 160 is an optimal example, and such results may not be achieved for every surface size. That is, the memory channel boundaries may not always line up with the boundaries of the sub-primitives.

Moving to the next line of the pseudo-code, if the width of the surface is not greater than 256, but the height of the surface is greater than 128 pixels, 2D dispatch processor 140 may be configured to divide the surface into four horizontal sub-primitives (Horizontal 4). Surface 162 of FIG. 7 is an example of such a division. Again, the threshold of 128 may be chosen such that the resultant sub-primitives are large enough to make efficient use of caches 144. In the example pseudo-code above, the width of the surface is checked before the height of the surface when making a determination of the number and arrangement of sub-primitives. However, it should be understood that the width and height determinations may be made in any order.

If neither the width nor height of the surface is greater than 256 and 128, respectively, 2D dispatch processor 140 next determines if both the width and height of the surface are greater than 64 and 16, respectively. If so, 2D dispatch processor 140 divides the surface into four sub-primitives in a 2×2 arrangement (Vertical 2, Horizontal 2). Surface 164 of FIG. 7 shows such a 2×2 arrangement.

If the width of the surface is greater than 64, but the height of the surface is not greater than 16, 2D dispatch processor 140 divides the surface into two sub-primitives in a vertical arrangement (Vertical 2). Surface 166 of FIG. 7 shows such a 2 sub-primitive vertical arrangement. If the width of the surface is not greater than 64, but the height of the surface is greater than 16, 2D dispatch processor 140 divides the surface into two sub-primitives in a horizontal arrangement (Horizontal 2). Surface 168 of FIG. 7 shows such a 2 sub-primitive horizontal arrangement.

If the surface is smaller than all of the aforementioned thresholds, 2D dispatch processor 140 does not divide the surface (Original). Instead, the entire surface is processed as a whole. Surface 170 of FIG. 7 shows the example where the surface is not divided. In some examples, each of 2D sub-engines 142 may be configured to operate on a different undivided surface (e.g., surface 170) in parallel. In this example, each of 2D sub-engines 142 may be configured to perform the same 2D operation on the different undivided surfaces, or may be configured to perform different 2D operations on each of the undivided surfaces.

If compression has not been enabled, 2D dispatch processor 140 next determines if the surface is stored in a macro-tiling or tiling storage mode. If either macro-tiling or tiling storage mode is used, 2D dispatch processor 140 next determines the type of operation to be performed on the surface. If the operation is a clear or BLT operation, the surface is not sub-divided, such as is shown by surface 170. For any other type of operation, 2D dispatch processor 140 then determines the width and/or height of the surface to determine a sub-division. However, the width and height thresholds used for the tiling or macro tiling storage mode are generally smaller than the thresholds used when the pixel data of the surface is compressed. This is because the amount of data per pixel is higher when compression is not used, so fewer pixels are needed for each sub-primitive in order to make more optimal use of caches 144. For example, as shown in the pseudo code above, for macro tiling storage mode and an operation other than clear or BLT, the Vertical 2 arrangement (e.g., surface 166) is used when the width of surface is greater than 64 pixels, and the Horizontal 2 arrangement (e.g., surface 168) is used when the height of the surface is greater than 16. Otherwise, the Original surface and is used is not divided (e.g. surface 170).

2D dispatch processor 140 may use a still different set of surface properties and thresholds when the surface is stored in a linear storage mode (e.g., rather than a tiling or macro-tiling storage mode). For example, if the edge of a surface lines up with a channel boundary and the width of the surface is greater than 256 pixels, 2D dispatch processor 140 uses the vertical 4 arrangement (e.g., surface 160). Otherwise, 2D dispatch processor 140 next determines the type of operation to be performed on the surface. If the operation is a clear or BLT operation, the surface is not sub-divided, such as is shown by surface 170. For any other type of operation, 2D dispatch processor 140 then determines the width and/or height of the surface to determine a sub-division. Again, the width and height thresholds used for linear storage mode are generally smaller than the thresholds used when the pixel data of the surface is compressed. This is because the amount of data per pixel is higher when compression is not used, so fewer pixels are needed for each sub-primitive in order to make more optimal use of caches 144. For example, as shown in the pseudo code above, for linear storage mode and an operation other than clear or BLT, the Vertical 2 arrangement (e.g., surface 166) is used when the width of surface is greater than 64 pixels, and the Horizontal 2 arrangement (e.g., surface 168) is used when the height of the surface is greater than 16. Otherwise, the Original surface is used and it is not divided (e.g. surface 170).

The above-discussed examples of FIG. 7 serve to improve memory channel efficiency. Additional techniques for adaptively determining a scanning pattern may be used to alleviate problems involving bank conflicts. The techniques discussed below may be used alone or in conjunction with any of the techniques described above.

Figure 8:
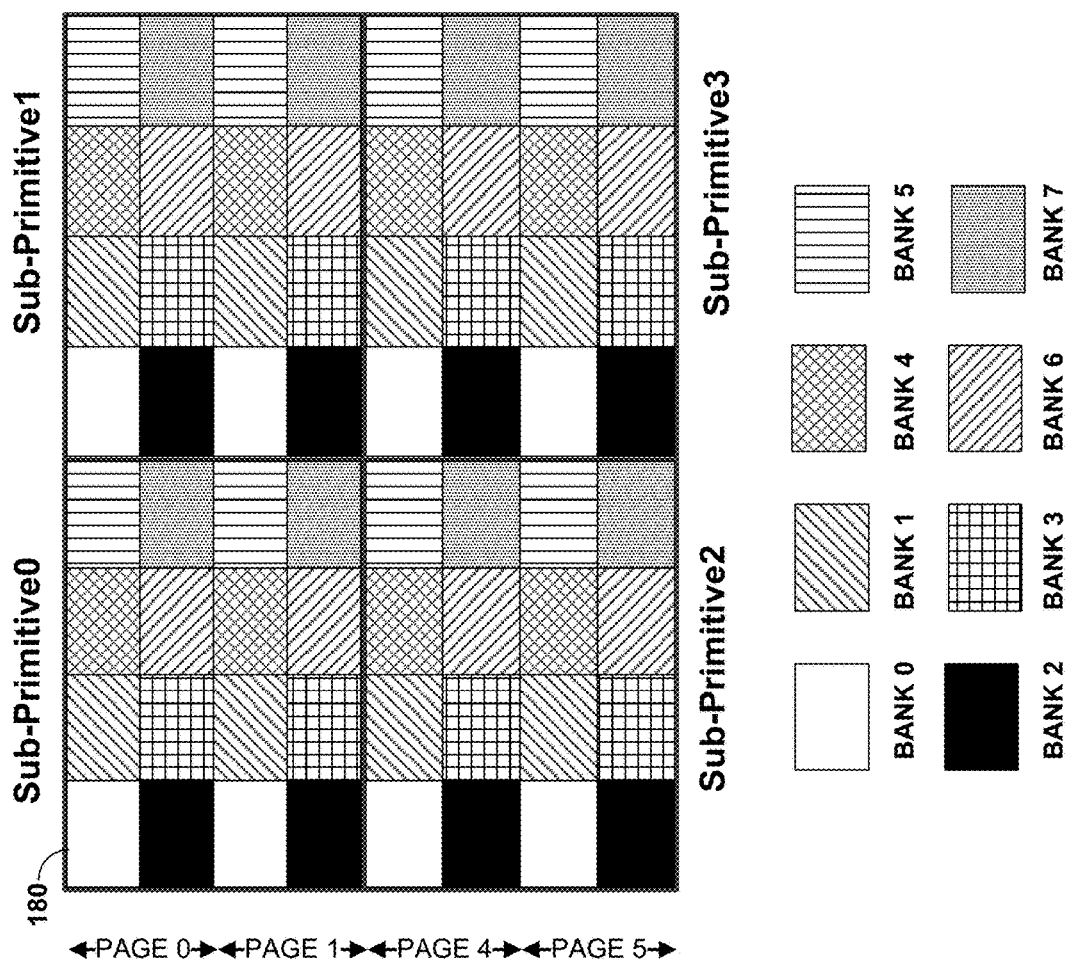
FIG. 8 is a conceptual diagram showing example memory bank arrangements.

FIG. 8 is a conceptual diagram showing example memory bank arrangements. In the example of FIG. 8, pixel data in each of the four sub-primitives of surface 180 is arranged in two pages of virtual memory, each page having eight banks. If a scan starts at the upper left corner of each sub-primitive, each 2D sub-engine 142 reading or writing pixel data for surface 180 will be accessing the same bank. Even if the banks are in different pages, only one bank of memory may be accessed at one time. As such, if the four 2D sub-engines 142 try to read or write pixel data in parallel, a bank conflict will occur. When a bank conflict occurs, each of 2D sub-engines would have to wait until another of the 2D sub-engines is finished accessing the conflicting bank before any other memory accesses to that bank would occur.

Figure 9:
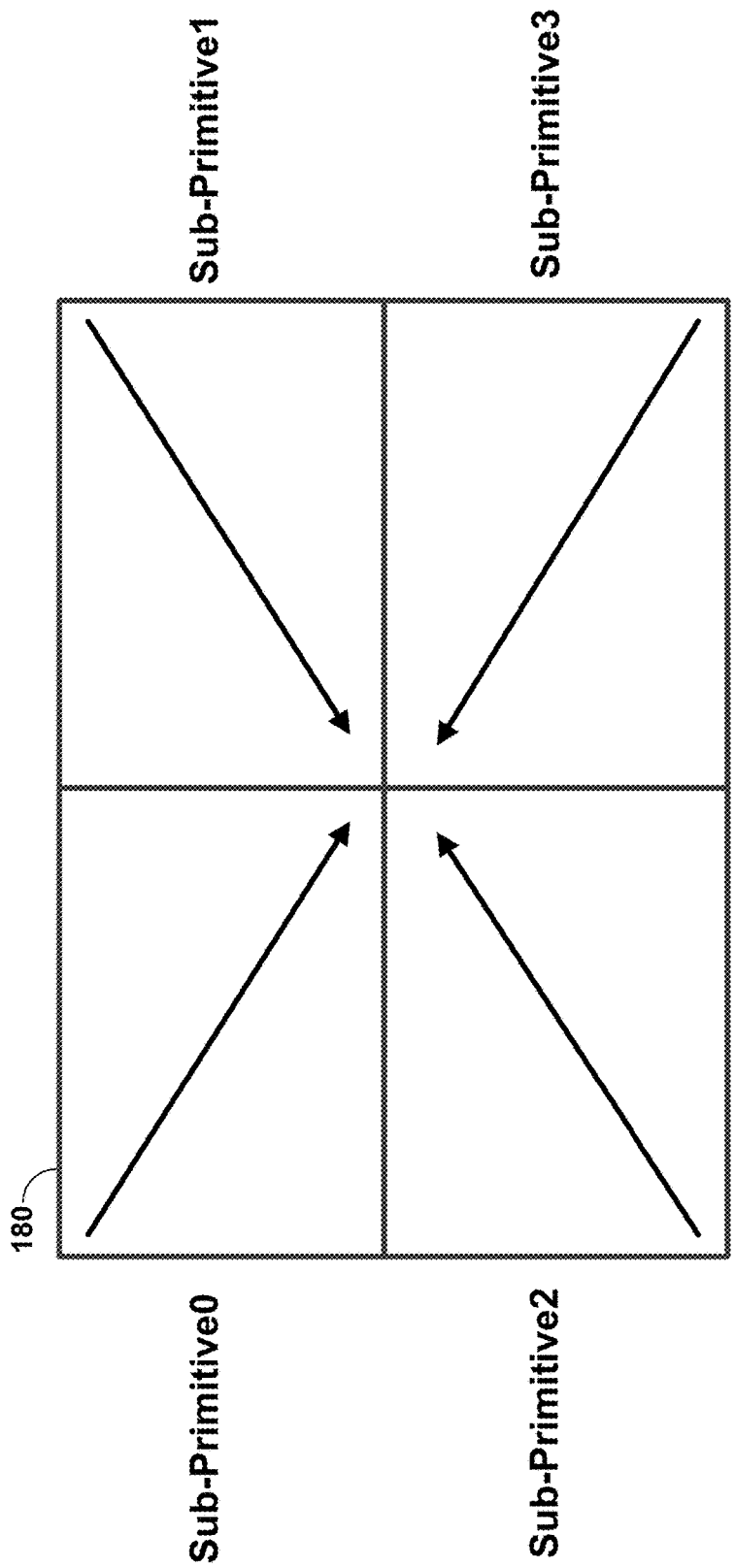
FIG. 9 is a conceptual diagram showing an example address scanning order according to one example of the disclosure.

To alleviate such a problem with bank conflicts, this disclosure proposes adaptively determining a scanning pattern for sub-primitives of a surface. The 2D dispatch processor 140, using the determined surface properties, may independently determine a scanning pattern for each sub-primitive. That is, each sub-primitive may have a different scanning pattern. In this context, a scanning pattern may refer to both the starting scan address within a sub-primitive and the order in which subsequent memory addresses are accessed. FIG. 9 is a conceptual diagram showing an example address scanning pattern according to one example of the disclosure. FIG. 9 shows surface 180 of FIG. 8 with the memory banks removed. The arrows within each of sub-primitives 0-3 indicate the general scanning pattern used within each sub-primitive. Any particular scan pattern may be used, as long as the starting memory address of the scan, together with the general scan direction, avoids bank conflicts.

As shown in FIG. 9, a scan pattern for sub-primitive0 starts in the upper-left corner and generally proceeds toward the lower-right corner (e.g., in a raster scan pattern). The scan pattern for sub-primitive1 starts in the upper-right corner and generally proceeds toward the lower-left corner. The scan pattern for sub-primitive2 starts in the lower-left corner and generally proceeds toward the upper-right corner. The scan pattern for sub-primitive3 starts in the lower-right corner and generally proceeds toward the upper-left corner. In this way, referring back to FIG. 8, each of the scan patterns of the four sub-primitives of surface 180 start reads and writes from a different memory bank. In one example of the disclosure, applying the scan patterns shown in FIG. 9 has shown to be effective in reducing bank conflicts in the situation where the surface is stored using a macro-tiling mode and the operation to be performed on surface 180 is not a geometric operation, such as scaling or rotating. However, as will be shown in the additional detailed examples below, other surface properties may be used in selecting the scanning pattern.

Testing has shown that the above-discussed features have provided improvement in DDR memory efficiency. On average DDR memory access efficiency improved more than 3% over conventional memory accessing techniques. An almost 8% increase in memory efficiency was realized for surfaces stored using a linear storage mode. An almost 11% increase in memory efficiency was seen for pixels of a surface stored in a YUV color format. An almost 9% increase in memory efficiency was seen for color conversions between RGB and YUV color formats.

Improvements in terms of the number of clock cycles needed for 2D sub-engines 142 to perform read and write operations was also realized. Using the techniques described above, a 3% decrease in clock cycles was realized on average. An almost 9% decrease in the number of clock cycles needed for reading and/or writing pixels stored in a linear storage mode was realized. A more than 11% decrease in the number of clock cycles needed for reading and/or writing pixels in a YUV color format was realized. A more than 11% decrease in the number of clock cycles needed for reading and/or writing pixels for color conversions between RGB and YUV color formats was realized.

FIGS. 10-14 below, and the related description, show a specific example for implementing the techniques of the disclosure. In the example implementation discussed below, the term "super block" is used in place of sub-primitives. The examples below provide techniques for dividing a surface into a particular number and arrangement of super blocks. The techniques below also describe patterns for scanning between super blocks. In addition, the techniques below describe how super blocks themselves may be divided into basic blocks. The techniques of dividing and arranging surfaces into super blocks may also be applied to dividing and arranging super blocks into basic blocks.

Like the general techniques described above, the example implementation described here uses surface properties (including the surface width and height in pixels) to divide a surface into one or more sub-primitives (also called "super blocks"). The arrangement of the super blocks may vary based on the storage mode of the surface (e.g., linear or tiling storage mode).

In this example implementation, the shape of each of the super blocks may be one of a "square" shape, a "minimum height" shape, or a "balance" shape. The square shape is used if both the source surface and the destination surface are stored in a tiling storage mode and the destination surface has a width of less than, for example, 64 pixels. As discussed above, a source surface is the surface on which 2D sub-engines 142 are performing an operation. The destination surface is the surface created by 2D sub-engines through performance of the operation on the source surface. If the source surface is in a tiling storage mode and the destination surface is wider than a particular threshold (e.g., 15 times the number of active 2D sub-engines 142), dispatch processor 140 divides the surface into super blocks having the minimum height shape. Otherwise, dispatch processor 140 divides the surface into super blocks having the balance shape.

The minimum height shape of super block may take on one of two pixel heights: 4 or 8. In the example implementation, the number of pixels used for the minimum height super block shape is determined by the pixel color format of the source and destination surfaces as shown in Table 1 below.

TABLE 1

| Minimum super-block height determination | | | |
|---|---|---|---|
| \Destination Source\ | RGB/YUY2/ AYUV | NV12-4R/ NV21-4R | IYUV |
| RGB/YUY2/AYUV | 4 | 8 | 8 |
| NV12-4R/NV21-4R | 4 | 4 (M1) | 4(M1) |

TABLE 1-continued

Minimum super-block height determination

| \Destination Source\ | RGB/YUY2/<br>AYUV | NV12-4R/<br>NV21-4R | IYUV |
|---|---|---|---|
| IYUV | 4 | 8 (M2)<br>4 (M1)<br>8 (M2) | 8(M2)<br>4 (M1)<br>8 (M2) |

In Table 1 above, M1 refers to a test model using a clear operation. M2 refers to a test model using a 2D format conversion. The actual sizes of the super-block are determined using the determined shape and the pixel size in bpp and/or color format. Example sizes of super blocks for this example implementation are shown in the table in FIG. 10.

The techniques of this disclosure may also be used to determine how many of 2D sub-engines 142 to use for a particular operation. That is, depending on whether or not the source and/or destination surfaces are compressed, a different number of 2D sub-engines 142 may be needed to perform the clear, BLT, or blend operations. Table 2 below shows one example of the number of 2D sub-engines 142 used for a set of operations.

TABLE 2

Number of 2D Sub-Engines per operation

| | Clear<br>(One read) | BLT<br>(One read,<br>one write) | Blend<br>(two read,<br>one write) |
|---|---|---|---|
| Source/Destination are both Compressed | 4 | 2 | 4 |
| One of Source/Destination is Compressed | 1 | 2 | 4 |
| Source/Destination are both not Compressed | 1 | 1 | 2 |

Figure 11:
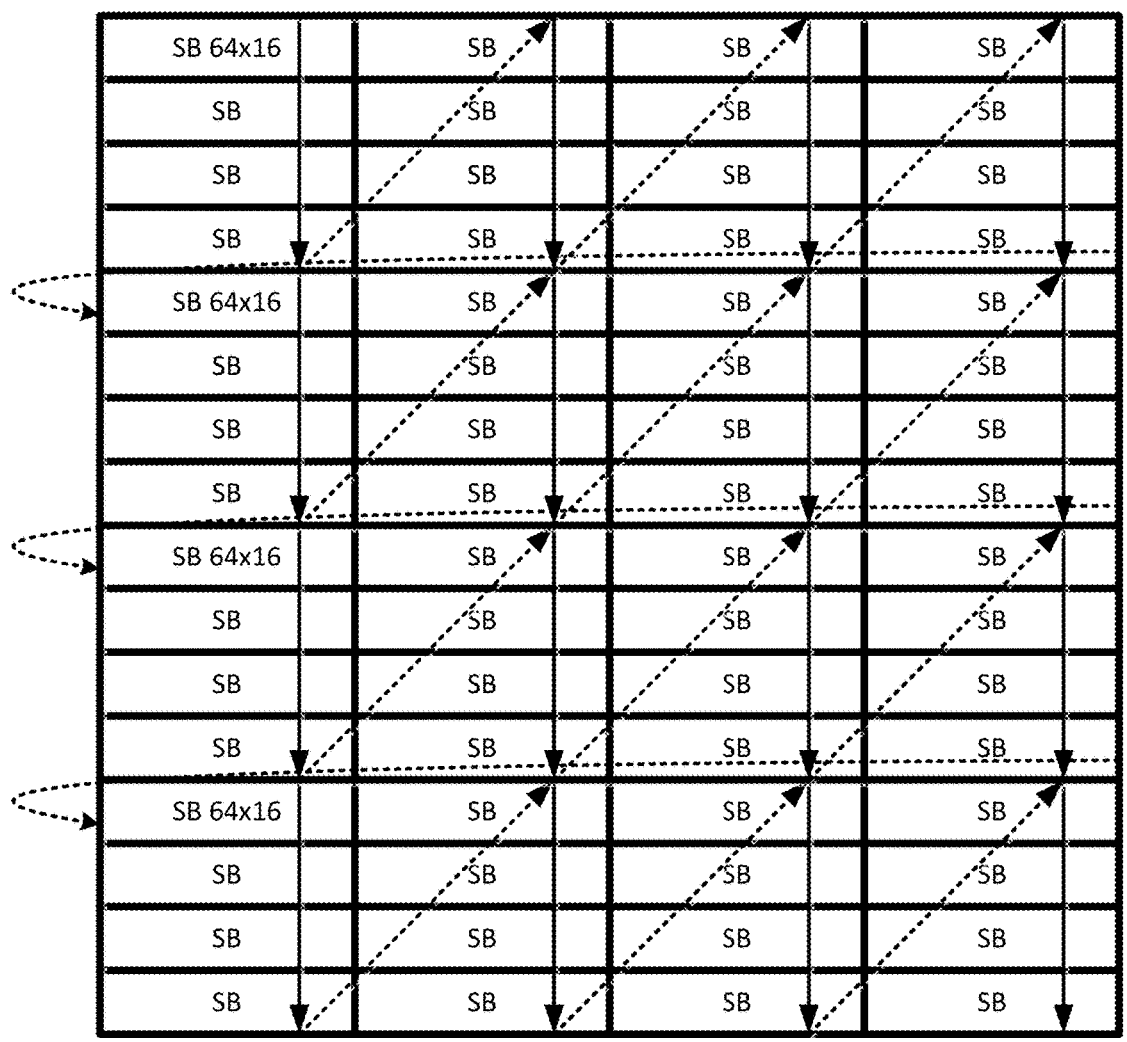
FIG. 11 is a conceptual diagram showing an example super block address scanning order according to one example of the disclosure.
Figure 12:
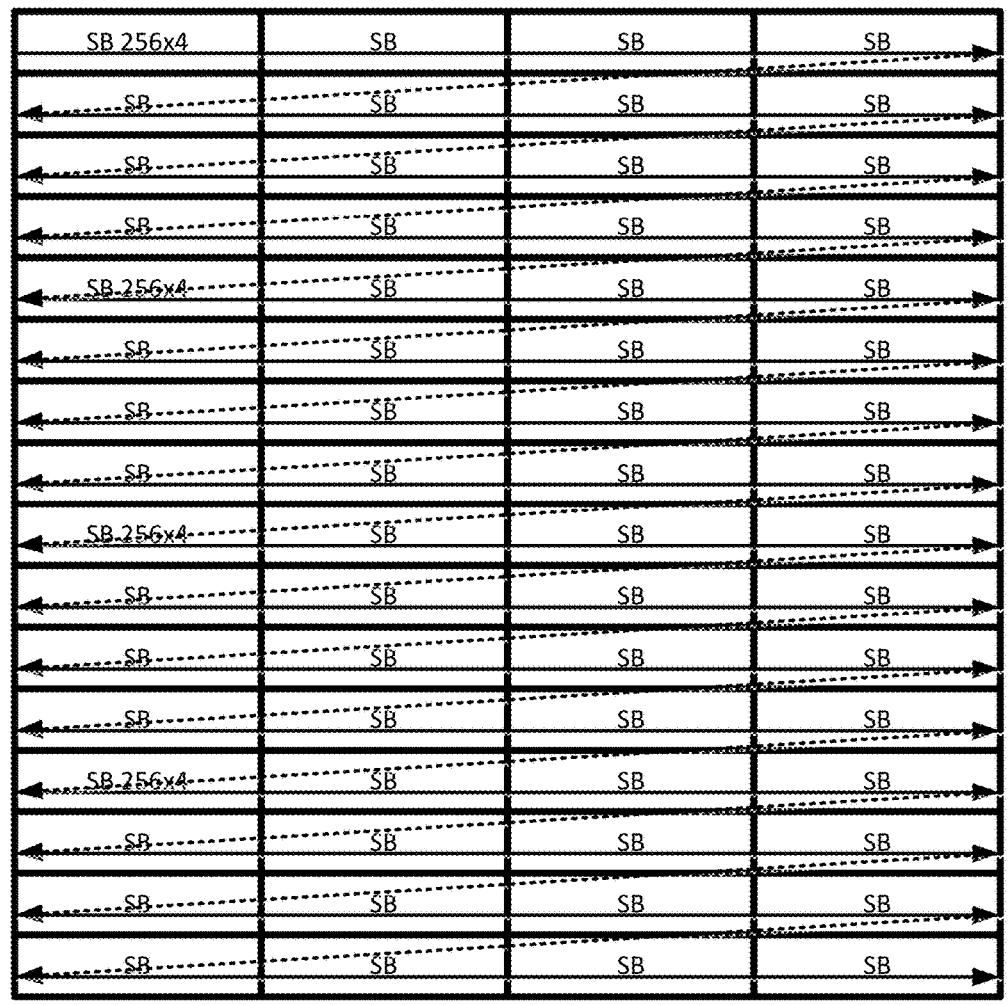
FIG. 12 is a conceptual diagram showing an example super block address scanning order according to another example of the disclosure.

When scanning the addresses of a super-block, 2D sub-engines 142 may access a register, e.g., set by 2D dispatch processor 140 that indicates the scanning direction for the super blocks. The order in which the super blocks are processed follows a looping style, examples of which are shown in FIGS. 11 and 12. If the source format is tiling, super blocks are processed vertically to a height of 64 pixels, before moving to the next section of super blocks. FIG. 11 is a conceptual diagram showing an example super block address scanning order according to one example of the disclosure. In FIG. 11, the source format is tiling, and the shape of the super blocks is a 64×16 "balance" shape. The size of the entire surface is 256×256 pixels with 128 bpp.

If the source format is linear, a horizontal loop is used to process the super blocks. FIG. 12 is a conceptual diagram showing an example super block address scanning order according to another example of the disclosure. In FIG. 12, the source format is linear, and the shape of the super blocks is a 256×4 "minimum height" shape. The size of the entire surface is 1024×64 pixels with 128 bpp.

For the looping styles in FIGS. 11 and 12, it should be understood that the super blocks are not necessarily processed sequentially. In some examples, one or more of 2D sub-engines 142 may process groups of super blocks of the surface in parallel. As with the example of FIG. 9 discussed above, the scanning pattern within each super block may be different.

Each super block may be further divided into basic blocks. Basic blocks are defined by the size of caches 144. For example, for a surface stored in tiling mode, each basic block comprises one tile or one compressed block. For a surface stored with a linear storage mode, each basic block may contain 2 k bits of data, where 2 k bits is the size of caches 144. Of course, different sizes of basic blocks may be used for different sizes of caches 144. Like super blocks, the size and shape of the basic blocks may be defined by both the surface storage format as well as the pixel size in bpp and/or color format. FIG. 13 is a table showing example sizes of basic blocks according to one example of the disclosure.

Figure 14:
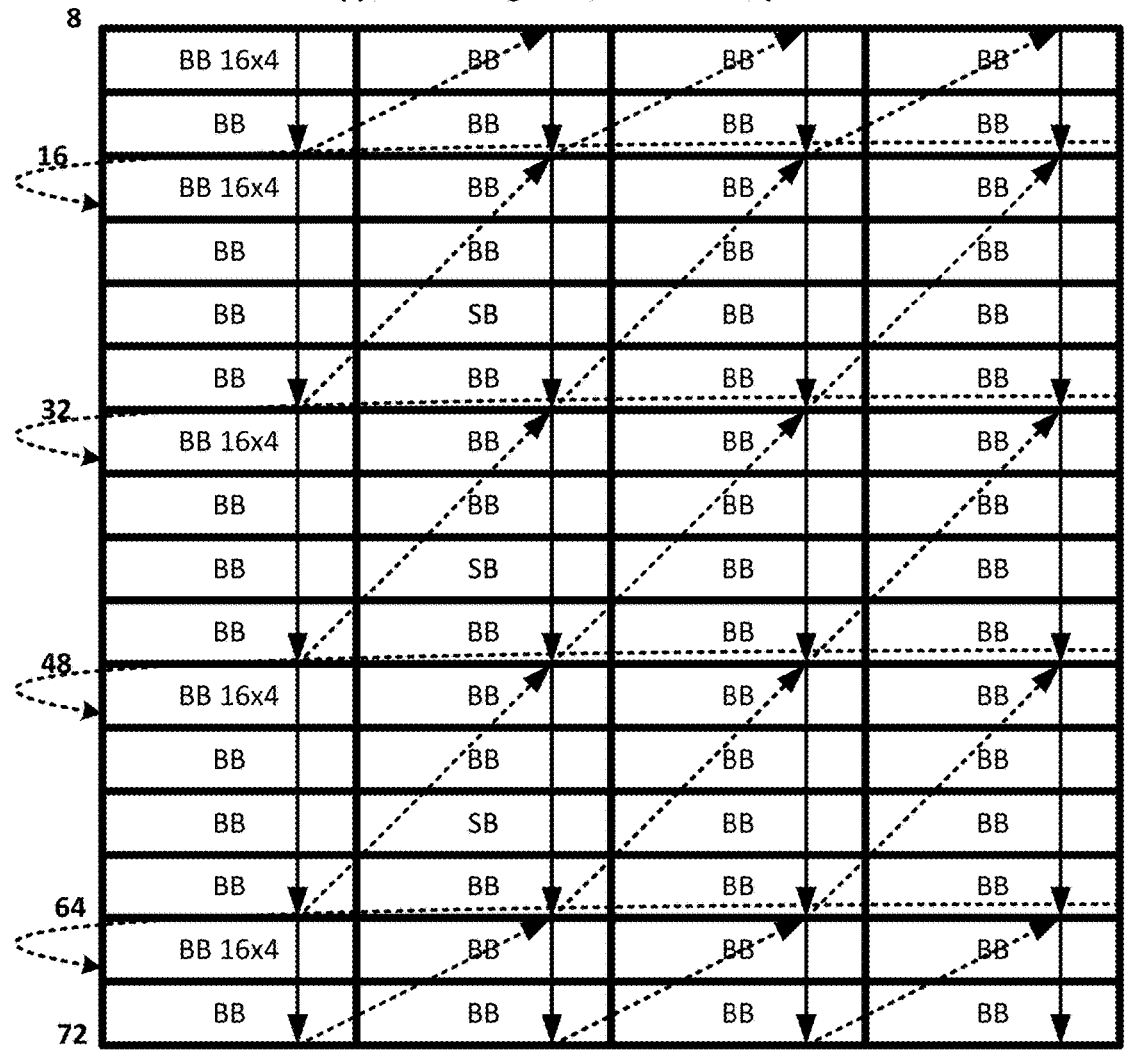
FIG. 14 is a conceptual diagram showing an example basic block s address canning order according to one example of the disclosure.

A looping pattern may also be defined for looping through the basis blocks within each super block. The looping pattern between basic blocks may be independently defined from the looping pattern between super blocks. FIG. 14 is a conceptual diagram showing an example basic block address scanning order according to one example of the disclosure. In the example of FIG. 14, the surface is stored in a tiling storage mode and the pixel size is 32 bpp. Therefore, per the table in FIG. 13, the size of the basic block is 16×4 pixels. The size and shape of each super block for such a surface, per the table in FIG. 10, is a 64×64 square shape. In the example of FIG. 14, the basic blocks begin at pixel position y=8.

Figure 15:
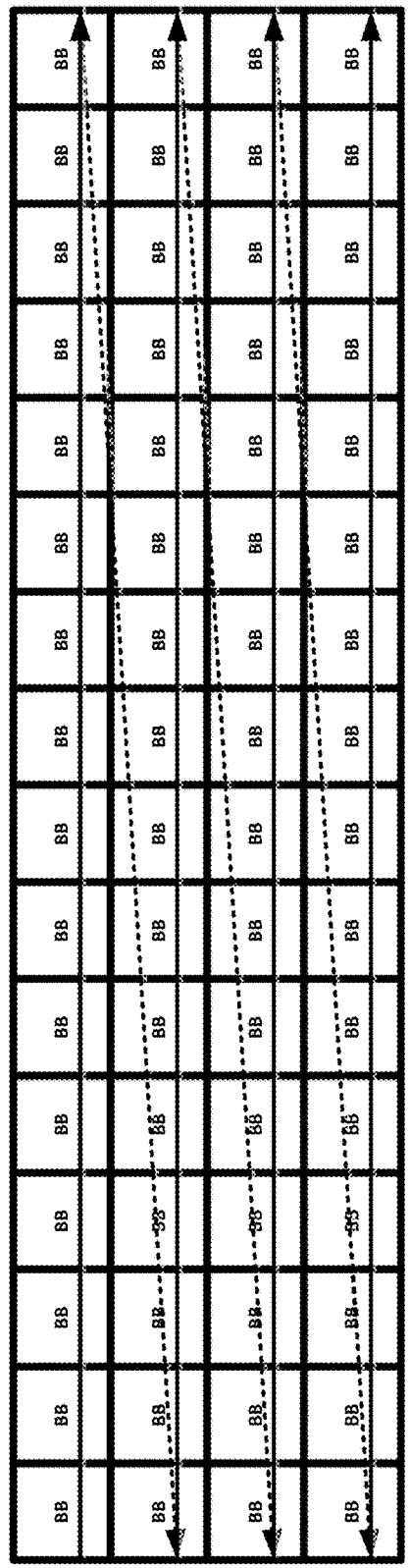
FIG. 15 is a conceptual diagram showing an example basic block address scanning order according to another example of the disclosure.

FIG. 15 is a conceptual diagram showing an example basic block address scanning order according to another example of the disclosure. In the example of FIG. 15, the surface is stored in linear storage mode and the pixel size is 32 bpp. Therefore, per the table in FIG. 13, the size of the basic block is 16×4 pixels. The size and shape of each super block for such a surface, per the table in FIG. 10, is a 256×16 balance shape. In the example of FIG. 15, the basic blocks begin at pixel position y=8.

In another example of the disclosure, 2D sub-engines 142 may be configured to read or write surfaces from two different directions within the surface. Such techniques may be used to balance the workload of bus interface 146 between two memory channels. The techniques of the disclosure for reading and writing in two different directions may be useful in situations where the surface to be read from and written to is stored in a linear storage mode and has a 2 k bytes aligned pitch (i.e., the edges of the surface are aligned with the memory channel width). Additionally, the techniques of the disclosure for reading and writing in two different directions may be useful in situations where the super block shape is a minimum height shape.

Figure 16:
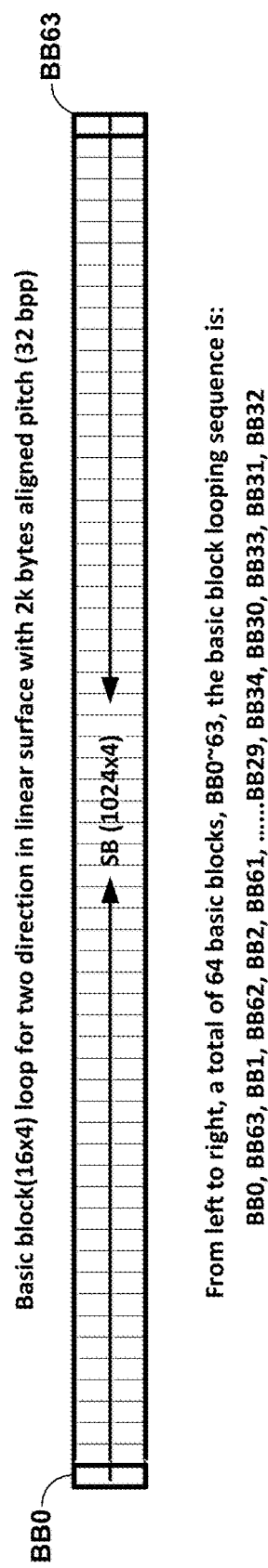
FIG. 16 is a conceptual diagram showing an example read/write address scanning order according to one example of the disclosure.

As shown in FIG. 15, for a surface stored in linear storage mode, a horizontal looping style is used to loop between basic blocks within a super block. In the situation where the linear surface is 2 k bytes aligned within a minimum height shape super block, one pixel line in the super block has 2 k/4 k byes of data (depending on minimum height of 4 or 8). This pixel line covers two different memory channels, and thus two channels within bus interface 146. In this situation, this disclosure proposes to perform reads or writes within a basic block using two different directions. FIG. 16 is a conceptual diagram showing an example read/write address scanning order according to one example of the disclosure.

As shown in FIG. 16, the looping pattern between basic blocks proceeds from both directions with the 1024×4 minimum height super block. Such a pattern takes advantage of the fact that the left half of the super blocks uses one channel of bus interface 146, while the right half of the super block uses another channel of bus interface 146. For the scanning pattern shown in FIG. 16, a 2D sub-engine 142 would begin the scan at basic block 0 (BB0). Instead of proceeding to BB1, 2D sub-engine 142 would next scan BB63 at the far right side of the super block. The next scan would then proceed to BB1 back on the left side of the super block. In this way, alternate reads or writes to the basic blocks would be performed alternatively through different channels of bus interface 146.

Figure 17:
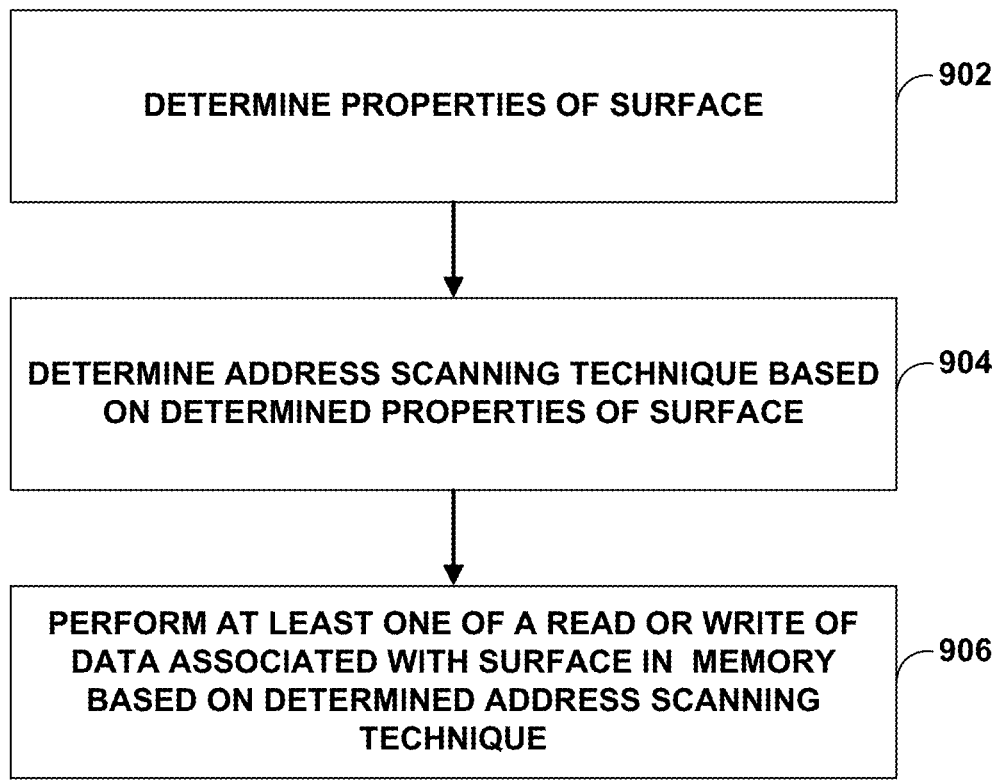
FIG. 17 is a flowchart illustrating an example method according to some examples of the disclosure.

FIG. 17 is a flowchart illustrating an example method according to some examples of the disclosure. The techniques of FIG. 17 may be performed by one or more hardware units of GPU 114, including 2D dispatch processor 140 and 2D sub-engines 142.

In one example of the disclosure, GPU 114 may be configured to access memory for graphics processing. GPU 114 may include 2D dispatch processor 140 configured to determine properties of a surface (902), and determine a memory address scanning technique based on the determined properties of the surface (904). GPU 114 may further include at least one 2D sub-engine 142 configured to perform at least one of a read or a write of data associated with the surface in the memory based on the determined memory address scanning technique (906). In one example of the disclosure, the properties of the surface include at least one of a storage mode, a surface height, a surface width, use of pixel compression, use of multi-sample anti-aliasing, a pixel size, or a pixel format.

In another example of the disclosure, 2D dispatch processor 140 is further configured to determine a number and a shape of sub-primitives in which to divide the surface based on the properties of the surface, and divide the surface into one or more sub-primitives based on the determined number and the shape of sub-primitives. In another example of the disclosure, 2D dispatch processor 140 is further configured to determine an arrangement of the determined number of sub-primitives based on the properties of the surface, and divide the surface into the determined arrangement of the determined number of sub-primitives.

In another example of the disclosure, at least one 2D sub-engine 142 is further configured to perform the at least one of the read or the write of data associated with each of the one or more sub-primitives.

In another example of the disclosure, 2D dispatch processor 140 is further configured to determine a number of the at least one 2D sub-engine 142 of GPU 114 used to perform the at least one of the read or the write of data based on properties of the surface. The determined number of 2D sub-engines is configured to perform the at least one of the read or the write of the data. In another example of the disclosure, the at least one 2D sub-engine 142 is further configured to perform at least one of the read or the write of data associated with each of the one or more sub-primitives in parallel.

In another example of the disclosure, 2D dispatch processor 140 is further configured to determine a number and a shape of sub-primitives in which to divide the surface based on the properties of the surface, and determine a scanning pattern for the determined number and the shape of sub-primitives based on the properties of the surface. In another example of the disclosure, 2D dispatch processor 140 is further configured to determine the scanning pattern for each the determined number of sub-primitives independently based on the properties of the surface.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A memory accessing method for graphics processing, the method comprising:

determining, by a graphics processing unit (GPU), properties of a format of a surface in a memory, wherein the surface includes pixel values of an image, and wherein the properties of the format of the surface include at least one of a surface height, a surface width, use of pixel compression, or use of multi-sample anti-aliasing;

dividing the surface into sub-primitives based on the properties of the format of the surface;

determining, by the GPU, memory address scanning techniques for the sub-primitives based on the properties of the format of the surface, wherein the GPU determines the memory address scanning techniques such that at least some of the sub-primitives are associated with different memory address scanning techniques, and wherein the memory address scanning techniques define a memory addressing patterns; and performing, by the GPU, at least one of a read or a write of data associated with the surface in the memory based on the determined memory address scanning techniques.

2. The method of claim 1, wherein dividing the surface into sub-primitives based on the properties of the format of the surface comprises:

determining, by the GPU, a number and a shape of sub-primitives in which to divide the surface based on the properties of the format of the surface; and dividing, by the GPU, the surface into one or more sub-primitives based on the determined number and shape of sub-primitives.

3. The method of claim 2, wherein determining the shape of sub-primitives in which to divide the surface based on the properties of the format of the surface further comprises:

determining, by the GPU, a shape of an arrangement of the determined number of sub-primitives based on the properties of the format of the surface; and dividing, by the GPU, the surface into the determined shape of the arrangement of the determined number of sub-primitives.

4. The method of claim 2, wherein performing the at least one of the read or the write of the data associated with the surface comprises:

performing, by the GPU, the at least one of the read or the write of data associated with each of the one or more sub-primitives.

5. The method of claim 4, further comprising:

determining a number of parallel address scanning engines used to perform the at least one of the read or the write of data based on the properties of the format of the surface; and performing the at least one of the read or the write of the data with the determined number of parallel address scanning engines.

6. The method of claim 4, wherein performing the at least one of the read or the write of data associated with each of the one or more sub-primitives comprises performing the at least one of the read or the write of data associated with each of the one or more sub-primitives in parallel.

7. The method of claim 1, wherein the memory address scanning techniques include a first memory addressing pattern starting from an upper left corner of the sub-primitives, a second memory addressing pattern starting from an upper right corner of the sub-primitives, a third memory addressing pattern starting from a lower left corner the sub-primitives, and a fourth memory address pattern starting from a lower right corner of the sub-primitives.

8. The method of claim 1, wherein the memory address scanning techniques include a first horizontal memory addressing pattern proceeding in a forward direction, and a second horizontal memory addressing pattern proceeding in a reverse direction.

9. An electronic device configured to access memory for graphics processing, the electronic device comprising:

a memory configured to store data associated with a surface in a memory; and a graphics processing unit (GPU) in communication with the memory, the GPU configured to:

determine properties of a format of the surface, wherein the surface includes pixel values of an image, and wherein the properties of the format of the surface include at least one of a surface height, a surface width, use of pixel compression, or use of multi-sample anti-aliasing;

divide the surface into sub-primitives based on the properties of the format of the surface;

determine memory address scanning techniques for the sub-primitives based on the properties of the format of the surface, wherein the GPU determines the memory address scanning techniques such that at least some of the sub-primitives are associated with different memory address scanning techniques, and wherein the memory address scanning techniques define memory addressing patterns; and perform at least one of a read or a write of the data associated with the surface in the memory based on the determined memory address scanning techniques.

10. The electronic device of claim 9, wherein to divide the surface into sub-primitives based on the properties of the format of the surface the GPU is further configured to:

determine a number and a shape of sub-primitives in which to divide the surface based on the properties of the format of the surface; and divide the surface into one or more sub-primitives based on the determined number and the shape of sub-primitives.

11. The electronic device of claim 10, wherein to determine the shape of sub-primitives in which to divide the surface based on the properties of the format of the surface, the GPU is further configured to:

determine a shape of an arrangement of the determined number of sub-primitives based on the properties of the format of the surface; and divide the surface into the determined shape of the arrangement of the determined number of sub-primitives.

12. The electronic device of claim 10, wherein to perform the at least one of the read or the write of the data associated with the surface, the GPU is further configured to:

perform the at least one of the read or the write of data associated with each of the one or more sub-primitives.

13. The electronic device of claim 12, wherein the GPU is further configured to:

determine a number of parallel address scanning engines of the GPU used to perform the at least one of the read or the write of data based on the properties of the format of the surface; and perform the at least one of the read or the write of the data with the determined number of parallel address scanning engines.

14. The electronic device of claim 12, wherein to perform the at least one of the read or the write of data associated with each of the one or more sub-primitives, the GPU is further configured to:
   perform the at least one of the read or the write of data associated with each of the one or more sub-primitives in parallel.

15. The electronic device of claim 9, wherein the memory and GPU are part of a mobile communications device.

16. The electronic device of claim 15, further comprising:
   a processor executing an application that causes the GPU to render the surface; and
   a display configured to display the rendered surface in accordance with the application.

17. The electronic device of claim 9, wherein the memory address scanning techniques include a first memory addressing pattern starting from an upper left corner of the sub-primitives, a second memory addressing pattern starting from an upper right corner of the sub-primitives, a third memory addressing pattern starting from a lower left corner the sub-primitives, and a fourth memory address pattern starting from a lower right corner of the sub-primitives.

18. The electronic device of claim 9, wherein the memory address scanning techniques include a first horizontal memory addressing pattern proceeding in a forward direction, and a second horizontal memory addressing pattern proceeding in a reverse direction.

19. A graphics processing unit (GPU) configured to access memory for graphics processing, the GPU comprising:
   a 2D dispatch processor configured to:
      determine properties of a format of a surface in a memory, wherein the surface includes pixel values of an image, and wherein the properties of the format of the surface include at least one of a surface height, a surface width, use of pixel compression, or use of multi-sample anti-aliasing;
      divide the surface into sub-primitives based on the properties of the format of the surface; and
      determine memory address scanning techniques for the sub-primitives based on the properties of the format of the surface, wherein the 2D dispatch processor determines the memory address scanning techniques such that at least some of the sub-primitives are associated with different memory address scanning techniques, and
      wherein the memory address scanning techniques define memory addressing patterns; and
   at least one 2D sub-engine configured to:
      perform at least one of a read or a write of the data associated with the surface in the memory based on the determined memory address scanning techniques.

20. The GPU of claim 19, wherein to divide the surface into sub-primitives based on the properties of the format of the surface the 2D dispatch processor is further configured to:
   determine a number and a shape of sub-primitives in which to divide the surface based on the properties of the format of the surface; and
   divide the surface into one or more sub-primitives based on the determined number and the shape of sub-primitives.

21. The GPU of claim 20, wherein to determine the shape of sub-primitives in which to divide the surface based on the properties of the format of the surface, the 2D dispatch processor is further configured to:
   determine a shape of an arrangement of the determined number of sub-primitives based on the properties of the format of the surface; and
   divide the surface into the determined shape of the arrangement of the determined number of sub-primitives.

22. The GPU of claim 20, wherein to perform the at least one of the read or the write of the data associated with the surface, the at least one 2D sub-engine is further configured to:
   perform the at least one of the read or the write of data associated with each of the one or more sub-primitives.

23. The GPU of claim 22, wherein the 2D dispatch processor is further configured to:
   determine a number of the at least one 2D sub-engine of the GPU used to perform the at least one of the read or the write of data based on the properties of the format of the surface; and
   perform the at least one of the read or the write of the data with the determined number of the at least one 2D sub-engines.

24. The GPU of claim 22, wherein to perform the at least one of the read or the write of data associated with each of the one or more sub-primitives, the at least one 2D sub-engine is further configured to:
   perform the at least one of the read or the write of data associated with each of the one or more sub-primitives in parallel.

25. The GPU of claim 19, wherein the memory address scanning techniques include a first memory addressing pattern starting from an upper left corner of the sub-primitives, a second memory addressing pattern starting from an upper right corner of the sub-primitives, a third memory addressing pattern starting from a lower left corner the sub-primitives, and a fourth memory address pattern starting from a lower right corner of the sub-primitives.

26. The GPU of claim 19, wherein the memory address scanning techniques include a first horizontal memory addressing pattern proceeding in a forward direction, and a second horizontal memory addressing pattern proceeding in a reverse direction.

27. An apparatus configured to access memory for graphics processing, the apparatus comprising:
   means for determining properties of a format of a surface in a memory, wherein the surface includes pixel values of an image, and wherein the properties of the format of the surface include at least one of a surface height, a surface width, use of pixel compression, or use of multi-sample anti-aliasing;
   means for dividing the surface into sub-primitives based on the properties of the format of the surface;
   means for determining memory address scanning techniques for the sub-primitives based on the properties of the format of the surface, wherein the means for determining determines the memory address scanning techniques such that at least some of the sub-primitives are associated with different memory address scanning techniques, and
   wherein the memory address scanning techniques define memory addressing patterns; and
   means for performing at least one of a read or a write of data associated with the surface in the memory based on the determined memory address scanning techniques.

28. The apparatus of claim 27, wherein the memory address scanning techniques include a first memory addressing pattern starting from an upper left corner of the sub-primitives, a second memory addressing pattern starting from an upper right corner of the sub-primitives, a third memory addressing pattern starting from a lower left corner the sub-primitives, and a fourth memory address pattern starting from a lower right corner of the sub-primitives.

29. The apparatus of claim 27, wherein the memory address scanning techniques include a first horizontal memory addressing pattern proceeding in a forward direction, and a second horizontal memory addressing pattern proceeding in a reverse direction.

30. The apparatus of claim 27, wherein means for dividing the surface into sub-primitives based on the properties of the format of the surface comprises:
- means for determining a number and a shape of sub-primitives in which to divide the surface based on the properties of the format of the surface; and
- means for dividing the surface into one or more sub-primitives based on the determined number and shape of sub-primitives.

\* \* \* \* \*